United States Patent
van Rooyen

(10) Patent No.: US 7,519,391 B2
(45) Date of Patent: *Apr. 14, 2009

(54) METHOD AND SYSTEM FOR CELLULAR NETWORK SERVICES AND AN INTELLIGENT INTEGRATED BROADCAST TELEVISION DOWNLINK HAVING INTELLIGENT SERVICE CONTROL WITH FEEDBACK

(75) Inventor: Pieter Gert Wessel van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 11/768,711

(22) Filed: Jun. 26, 2007

(65) Prior Publication Data

US 2007/0249391 A1    Oct. 25, 2007

Related U.S. Application Data

(63) Continuation of application No. 11/010,743, filed on Dec. 13, 2004, now Pat. No. 7,242,960.

(51) Int. Cl.
    H04Q 7/20    (2006.01)
(52) U.S. Cl. .................. 455/552.1; 455/3.02; 455/556.1
(58) Field of Classification Search .................. None
    See application file for complete search history.

(56) References Cited

U.S. PATENT DOCUMENTS

| | | |
|---|---|---|
| 6,643,510 B2 | 11/2003 | Taylor |
| 6,650,374 B2 | 11/2003 | Choi et al. |
| 7,024,480 B2 | 4/2006 | Karim |
| 7,103,374 B2 | 9/2006 | Yia-Jaaski et al. |

(Continued)

FOREIGN PATENT DOCUMENTS

DE    10116246    3/2003

(Continued)

OTHER PUBLICATIONS

Siemens Mobile, Broadcasting @ Siemens Mobile, ICM MP,Martin Gebler, Broadcast Media in Mobile, London, Apr. 20, 2004, ICM MP SM DB, IPDC, pp. 1-13.

(Continued)

Primary Examiner—Erika A Gary
(74) Attorney, Agent, or Firm—McAndrews, Held & Malloy Ltd.

(57) ABSTRACT

In an RF communication system, aspects for cellular network and intelligent integrated broadcast television downlink with intelligent service control with feedback may comprise a mobile terminal (MT) generating a request for media comprising a specified quality of service (QoS) to be delivered to the mobile terminal. The request may be sent via a cellular service. The QoS may be negotiated between the MT and the cellular service and/or a broadcast service, where the cellular service and/or the broadcast service may provide the requested media. The specified QoS may be determined based on, for example, a received channel condition. The media may be received by the MT via a single integrated cellular and VHF/UHF baseband processor, and the received media may be consumed by the MT. The broadcast service may comprise, for example, a cellular broadcast service and VHF/UHF broadcast services such as, for example, DVB, ISDB, ISDB terrestrial, and ATSC services.

78 Claims, 16 Drawing Sheets

U.S. PATENT DOCUMENTS

| | | | |
|---|---|---|---|
| 7,242,960 B2 * | 7/2007 | van Rooyen | 455/552.1 |
| 2002/0176402 A1 | 11/2002 | Karim | |
| 2003/0043786 A1 | 3/2003 | Kall | |
| 2004/0179605 A1 | 9/2004 | Lane | |
| 2004/0198217 A1 | 10/2004 | Lee et al. | |
| 2005/0215194 A1 | 9/2005 | Boling et al. | |
| 2006/0048208 A1 | 3/2006 | Sibley et al. | |
| 2006/0128304 A1 | 6/2006 | Ramaswamy | |
| 2006/0128375 A1 * | 6/2006 | van Rooyen | 455/426.1 |

FOREIGN PATENT DOCUMENTS

| | | |
|---|---|---|
| EP | 1420593 | 5/2004 |
| WO | WO0172076 | 9/2001 |
| WO | WO03001772 | 1/2003 |

OTHER PUBLICATIONS

DVB Digital Video Broadcasting, Transmission System for Handheld Terminals (DVB-H) DVB document A081, Jun. 2004, pp. 1-11.

DVB Digital Video Broadcasting, The Convergence of Broadcast & Telecommunications Platforms, TM2466 Rev 4, UMTS23Rev1, written by ad hoc Group DVB-UMTS, Editor: Rainer Lueder, Report No. 1 (full), Jun. 2, 2002, pp. 1-73.

European Search Report, Apr. 7, 2006, 3 pp.

* cited by examiner

METHOD AND SYSTEM FOR CELLULAR NETWORK SERVICES AND AN INTELLIGENT INTEGRATED BROADCAST TELEVISION DOWNLINK HAVING INTELLIGENT SERVICE CONTROL WITH FEEDBACK

CROSS-REFERENCE TO RELATED APPLICATIONS/INCORPORATION BY REFERENCE

This is a continuation of application Ser. No. 11/010,743, filed Dec. 13, 2004, now U.S. Pat. No. 7,242,960.

This application also makes reference to:
U.S. patent application Ser. No. 11/010,991, filed Dec. 13, 2004;
U.S. patent application Ser. No. 11/010,847, filed Dec. 13, 2004;
U.S. patent application Ser. No. 11/010,461, filed Dec. 13, 2004;
U.S. patent application Ser. No. 11/010,877, filed Dec. 13, 2004;
U.S. patent application Ser. No. 11/010,914, filed Dec. 13, 2004;
U.S. patent application Ser. No. 11/010,486, filed Dec. 13, 2004;
U.S. patent application Ser. No. 11/010,903, filed Dec. 13, 2004;
U.S. patent application Ser. No. 11/011,009, filed Dec. 13, 2004;
U.S. patent application Ser. No. 11/010,855, filed Dec. 13, 2004;
U.S. patent application Ser. No. 11/010,983, filed Dec. 13, 2004;
U.S. patent application Ser. No. 11/011,000, filed Dec. 13, 2004;
U.S. patent application Ser. No. 11/010,681, filed Dec. 13, 2004;
U.S. patent application Ser. No. 11/010,883, filed Dec. 13, 2004;
U.S. patent application Ser. No. 11/011,006, filed Dec. 13, 2004;
U.S. patent application Ser. No. 11/010,487, filed Dec. 13, 2004;
U.S. patent application Ser. No. 11/010,481, filed Dec. 13, 2004; and
U.S. patent application Ser. No. 11/010,524, filed Dec. 13, 2004.

All of the above stated applications are hereby incorporated herein by reference in their entirety.

FIELD OF THE INVENTION

Certain embodiments of the invention relate to wireless transmission of data. More specifically, certain embodiments of the invention relate to a method and system for cellular network services and an intelligent integrated broadcast television downlink having intelligent service control with feedback.

BACKGROUND OF THE INVENTION

Broadcasting and telecommunications have historically occupied separate fields. In the past, broadcasting was largely an "over-the-air" medium while wired media carried telecommunications. That distinction may no longer apply as both broadcasting and telecommunications may be delivered over either wired or wireless media. Present development may adapt broadcasting to mobility services. One limitation has been that broadcasting may often require high bit rate data transmission at rates higher than could be supported by existing mobile communications networks. However, with emerging developments in wireless communications technology, even this obstacle may be overcome.

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology that may introduce fully packet-switched networks, which support high-speed data communications.

The general packet radio service (GPRS), which is an example of a 2.5G network service oriented for data communications, comprises enhancements to GSM that required additional hardware and software elements in existing GSM network infrastructures. Where GSM may allot a single time slot in a time division multiple access (TDMA) frame, GPRS may allot up to 8 such time slots providing a data transfer rate of up to 115.2 kbits/s. Another 2.5G network, enhanced data rates for GSM evolution (EDGE), also comprises enhancements to GSM, and like GPRS, EDGE may allocate up to 8 time slots in a TDMA frame for packet-switched, or packet mode, transfers. However, unlike GPRS, EDGE adapts 8 phase shift keying (8-PSK) modulation to achieve data transfer rates that may be as high as 384 kbits/s.

The universal mobile telecommunications system (UMTS) is an adaptation of a 3G system, which is designed to offer integrated voice, multimedia, and Internet access services to portable user equipment. The UMTS adapts wideband CDMA (WCDMA) to support data transfer rates, which may be as high as 2 Mbits/s. One reason why WCDMA may support higher data rates is that WCDMA channels may have a bandwidth of 5 MHz versus the 200 kHz channel bandwidth in GSM. A related 3G technology, high speed downlink packet access (HSDPA), is an Internet protocol (IP) based service oriented for data communications, which adapts WCDMA to support data transfer rates of the order of 10 Mbits/s. HSDPA achieves higher data rates through a plurality of methods. For example, many transmission decisions may be made at the base station level, which is much closer to the user equipment as opposed to being made at a mobile switching center or office. These may include decisions about the scheduling of data to be transmitted, when data are to be retransmitted, and assessments about the quality of the transmission channel. HSDPA may also utilize variable coding rates in transmitted data. HSDPA also supports 16-level quadrature amplitude modulation (16-QAM) over a high-speed downlink shared channel (HS-DSCH), which permits a plurality of users to share an air interface channel.

The multiple broadcast/multicast service (MBMS) is an IP datacast service, which may be deployed in EDGE and UMTS networks. The impact of MBMS is largely within the network in which a network element adapted to MBMS, the broadcast multicast service center (BM-SC), interacts with other network elements within a GSM or UMTS system to manage the distribution of content among cells within a network. User equipment may be required to support functions for the activation and deactivation of MBMS bearer service. MBMS may be adapted for delivery of video and audio information over wireless networks to user equipment. MBMS may be integrated with other services offered over the wireless network to realize multimedia services, such as multicasting, which may require two-way interaction with user equipment.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The ISDB-T system has been adopted in Japan and adapts bandwidth segmented transmission orthogonal frequency division multiplexing (BST-OFDM). The various DTTB systems may differ in important aspects; some systems employ a 6 MHz channel separation, while others may employ 7 MHz or 8 MHz channel separations. Planning for the allocation of frequency spectrum may also vary among countries with some countries integrating frequency allocation for DTTB services into the existing allocation plan for legacy analog broadcasting systems. In such instances, broadcast towers for DTTB may be co-located with broadcast towers for analog broadcasting services with both services being allocated similar geographic broadcast coverage areas. In other countries, frequency allocation planning may involve the deployment of single frequency networks (SFNs), in which a plurality of towers, possibly with overlapping geographic broadcast coverage areas (also known as "gap fillers"), may simultaneously broadcast identical digital signals. SFNs may provide very efficient use of broadcast spectrum as a single frequency may be used to broadcast over a large coverage area in contrast to some of the conventional systems, which may be used for analog broadcasting, in which gap fillers transmit at different frequencies to avoid interference.

Even among countries adopting a common DTTB system, variations may exist in parameters adapted in a specific national implementation. For example, DVB-T not only supports a plurality of modulation schemes, comprising quadrature phase shift keying (QPSK), 16-QAM, and 64 level QAM (64-QAM), but DVB-T offers a plurality of choices for the number of modulation carriers to be used in the COFDM scheme. The "2K" mode permits 1,705 carrier frequencies that may carry symbols, each with a useful duration of 224 μs for an 8 MHz channel. In the "8K" mode there are 6,817 carrier frequencies, each with a useful symbol duration of 896 μs for an 8 MHz channel. In SFN implementations, the 2K mode may provide comparatively higher data rates but smaller geographical coverage areas than may be the case with the 8K mode. Different countries adopting the same system may also employ different channel separation schemes.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area SFN. There are also significant challenges in deploying broadcast services to mobile user equipment. Many handheld portable devices, for example, may require that services consume minimum power to extend battery life to a level which may be acceptable to users. Another consideration is the Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H).

To meet requirements for mobile broadcasting the DVB-H specification may support time slicing to reduce power consumption at the user equipment, addition of a 4K mode to enable network operators to make tradeoffs between the advantages of the 2K mode and those of the 8K mode, and an additional level of forward error correction on multiprotocol encapsulated data-forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM), which may be most resilient to transmission errors. MPEG audio and video services may be more resilient to error than data, thus additional forward error correction may not be required to meet DTTB service objectives.

Time slicing may reduce power consumption in user equipment by increasing the burstiness of data transmission. Instead of transmitting data at the received rate, under time slicing techniques, the transmitter may delay the sending of data to user equipment and send data later but at a higher bit rate. This may reduce total data transmission time over the air, time, which may be used to temporarily power down the receiver at the user equipment. Time slicing may also facilitate service handovers as user equipment moves from one cell to another because the delay time imposed by time slicing may be used to monitor transmitters in neighboring cells. The MPE-FEC may comprise Reed-Solomon coding of IP data packets, or packets using other data protocols. The 4K mode in DVB-H may utilize 3,409 carriers, each with a useful duration of 448 μs for an 8 MHz channel. The 4K mode may enable network operators to realize greater flexibility in network design at minimum additional cost. Importantly, DVB-T and DVB-H may coexist in the same geographical area. Transmission parameter signaling (TPS) bits that are carried in the header of transmitted messages may indicate whether a given DVB transmission is DVB-T or DVB-H, in addition to indicating whether DVB-H specific features, such as time slicing, or MPE-FEC are to be performed at the receiver. As time slicing may be a mandatory feature of DVB-H, an indication of time slicing in the TPS may indicate that the received information is from a DVB-H service.

In a handheld device, battery life may be a concern. As discussed, transmission technology may affect the battery life. More generally, the handset battery life may be affected by the system components, including the number of chips in the handset. The handset battery life may also be affected by the frequency at which the components operate—the faster the operating speed, the higher the power consumption. Additionally, the mobility of the handheld device may present problems. As the handheld device moves with respect to a transmitting antenna, the signals communicated to and/or from the handheld device may be degraded, for example, due to signal interference from other RF signals and/or "dead zones" where signal strength decreases suddenly. At times, the handheld device may move out of range of the transmitting antenna, resulting in loss of signal from the transmitting antenna.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for cellular network services and an intelligent integrated broadcast television downlink having intelligent service control with feedback, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for cellular network services and an intelligent integrated broadcast television downlink having intelligent service control with feedback. Aspects of the method may comprise a mobile terminal generating a request for media and a specified quality of service (QoS) for delivering the media to the mobile terminal. The request may be sent, for example, via a cellular service. The mobile terminal may communicate with the cellular service via uplink and downlink communication paths. The QoS may be negotiated, for example, between the mobile terminal and the cellular service and/or a broadcast service, where the cellular service and/or the broadcast service may provide the requested media. The specified QoS may be based on, for example, a received channel condition. The requested media may be received by the mobile terminal via a single integrated cellular and VHF/UHF baseband processor, and the received media may be consumed by the mobile terminal.

The broadcast service may comprise, for example, a cellular broadcast service and/or VHF/UHF broadcast service. The cellular broadcast service may comprise, for example, downlink communication only, or downlink and uplink communication. The cellular broadcast service and/or the cellular service may be provided by, for example, a wireless service provider. The VHF/UHF broadcast service may comprise, for example, digital video broadcasting (DVB) service, integrated service digital broadcasting (ISDB) service, integrated service digital broadcasting (ISDB) terrestrial service, and/or advanced television systems committee (ATSC) broadcast service. The requested media may be received by dynamically switching from the cellular service to the broadcast service if the cellular service is not able to support the specified QoS while the broadcast service is able to support the specified QoS. Similarly, the requested media may be received by dynamically switching from the broadcast service to the cellular service. Additionally, a portion of the requested media with the specified QoS may be received from the broadcast service and another portion of the requested media with the specified QoS may be received from the cellular service. The requested media may be received via, for example, global system for mobile communications (GSM), general packet radio service (GPRS), enhanced data rates for GSM evolution (EDGE), code division multiple access 2000 (CDMA2000), wideband CDMA (WCDMA), high speed downlink packet access (HSDPA) systems, and/or multiple broadcast/multicast service (MBMS).

Figure 1A:
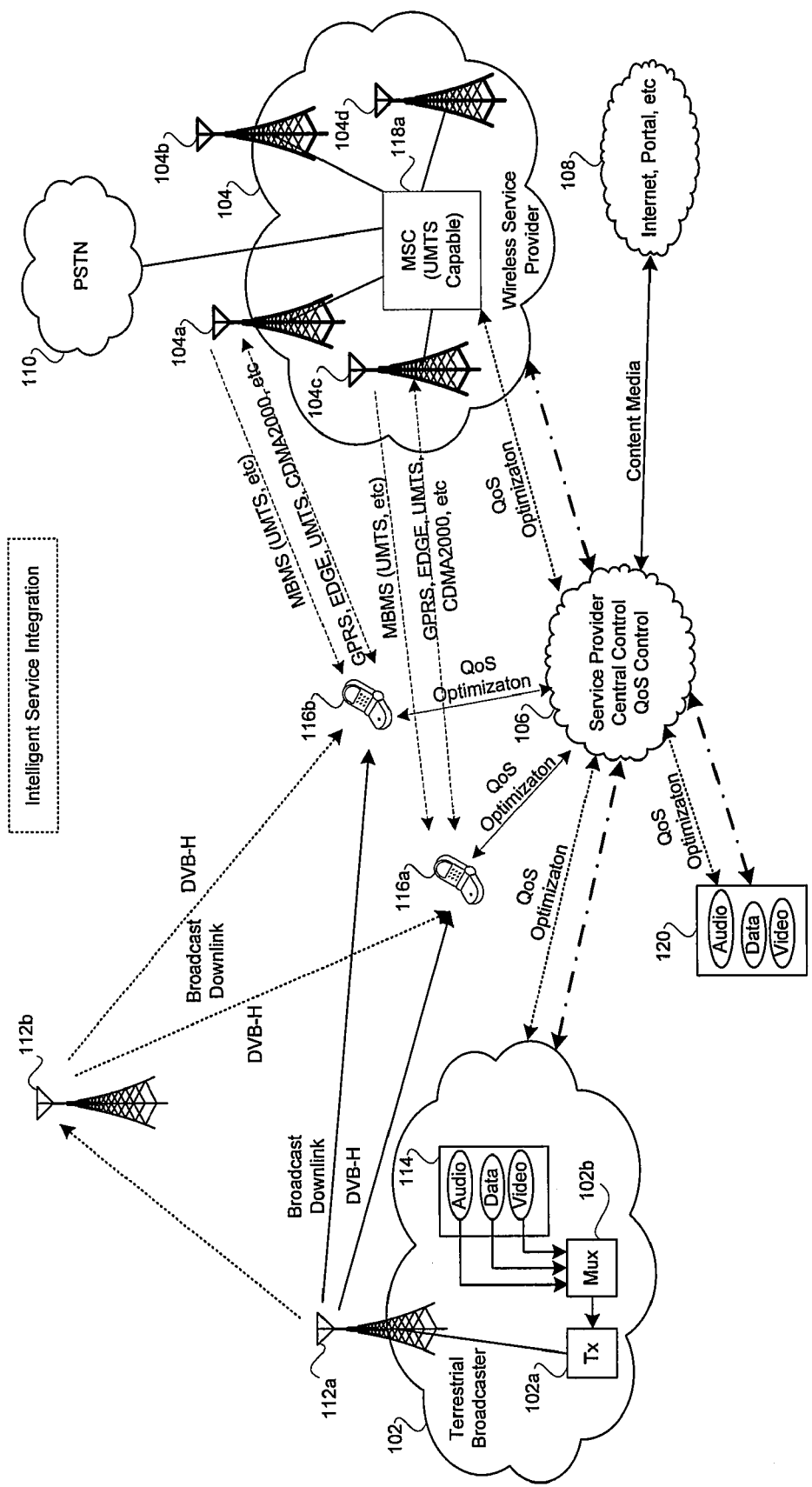
FIG. 1a is a block diagram of exemplary system for providing integrated services between a cellular network and a digital video broadcast network, in accordance with an embodiment of the invention.

FIG. 1a is a block diagram of an exemplary system for providing integrated services between a cellular network and a digital video broadcast network, in accordance with an embodiment of the invention. Referring to FIG. 1a, there is shown terrestrial broadcaster network 102, wireless service provider network 104, service provider 106, portal 108, public switched telephone network 110, and mobile terminals (MTs) 116a and 116b. The terrestrial broadcaster network 102 may comprise transmitter (Tx) 102a, multiplexer (Mux) 102b, and information content source 114. The content source 114 may also be referred to as a data carousel, which may comprise audio, data and video content. The terrestrial broadcaster network 102 may also comprise VHF/UHF broadcast antennas 112a and 112b. The wireless service provider network 104 may comprise mobile switching center (MSC) 118a, and a plurality of cellular base stations 104a, 104b, 104c, and 104d.

The terrestrial broadcaster network 102 may comprise suitable equipment that may be adapted to encode and/or encrypt data for transmission via the transmitter 102a. The transmitter 102a in the terrestrial broadcast network 102 may be adapted to utilize VHF/UHF broadcast channels to communicate information to the mobile terminals 116a, 116b. The multiplexer 102b associated with the terrestrial broadcaster network 102 may be utilized to multiplex data from a plurality of sources. For example, the multiplexer 102b may be adapted to multiplex various types of information such as audio, video and/or data into a single pipe for transmission by the transmitter 102a. Content media from the portal 108, which may be handled by the service provider 106 may also be multiplexed by the multiplexer 102b. The portal 108 may be an ISP service provider. Although DVB is illustrated as the VHF/UHF standard, the invention is not limited in this regard. Accordingly, ATSC, ISDB or other VHF/UHF standard may be utilized.

In one aspect of the invention, the terrestrial broadcaster network 102 may be adapted to provide one or more digital television (DTV) channels to the service provider 106. In this regard, the terrestrial broadcaster network 102 may comprise suitable high-speed or broadband interfaces that may be utilized to facilitate transfer of the DTV channels from the terrestrial broadcast network 102 to the service provider. The service provider 106 may then utilize at least a portion of the DTV channels to provide television (TV) on demand service, or other similar types of services to the wireless service provider network 104. Accordingly, the service provider 106 may further comprise suitable high-speed or broadband interfaces that may be utilized to facilitate the transfer of related TV on demand information to the MSC 118a.

Although communication links between the terrestrial broadcast network 102 and the service provider 106, and also the communication links between the service provider 106 and the wireless service provider 104 may be wired communication links, the invention may be not so limited. Accordingly, at least one of these communication links may be wireless communication links. In an exemplary embodiment of the invention, at least one of these communication links may be an 802.x based communication link such as 802.16 or WiMax broadband access communication link. In another exemplary embodiment of the invention, at least one of these connections may be a broadband line of sight (LOS) connection.

The wireless service provider network 104 may be a cellular or personal communication service (PCS) provider that may be adapted to handle broadcast UMTS (B-UMTS). The term cellular as utilized herein refers to both cellular and PCS frequencies bands. Hence, usage of the term cellular may comprise any band of frequencies that may be utilized for cellular communication and/or any band of frequencies that may be utilized for PCS communication. Notwithstanding, broadcast UMTS (B-UMTS) may also be referred to as MBMS. MBMS is a high-speed data service that is overlaid on WCDMA to provide much higher data rates than may be provided by core WCDMA. In this regard, the B-UMTS services may be superimposed on the cellular or PCS network.

The wireless service provider network 104 may utilize cellular or PCS access technologies such as GSM, CDMA, CDMA2000, WCDMA, AMPS, N-AMPS, and/or TDMA. The cellular network may be utilized to offer bi-directional services via uplink and downlink communication channels, while the B-UMTS or MBMS network may be utilized to provide a unidirectional broadband services via a downlink channel. The B-UMTS or MBMS unidirectional downlink channel may be utilized to broadcast content media and/or multimedia type information to the mobile terminals 116a and 116b. Although MBMS provides only unidirectional downlink communication, the invention may be not so limited. In this regard, other bi-directional communication methodologies comprising uplink and downlink capabilities, whether symmetric or asymmetric, may be utilized.

Although the wireless service provider network 104 is illustrated as a GSM, CDMA, WCDMA based network and/or variants thereof, the invention is not limited in this regard. Accordingly, the wireless service provider network 104 may be an 802.11 based wireless network or wireless local area network (WLAN). The wireless service provider network 104 may also be adapted to provide 802.11 based wireless communication in addition to GSM, CDMA, WCDMA, CDMA2000 based network and/or variants thereof. In this case, the mobile terminals 116a, 116b may also be compliant with the 802.11 based wireless network.

In accordance with an exemplary embodiment of the invention, if the mobile terminal (MT) 116a is within an operating range of the VHF/UHF broadcasting antenna 112a and moves out of the latter's operating range and into an operating range of the VHF/UHF broadcasting antenna 112b, then VHF/UHF broadcasting antenna 112b may be adapted to provide VHF/UHF broadcast services to the mobile terminal 116a. If the mobile terminal 116a subsequently moves back into the operating range of the VHF/UHF broadcasting antenna 112a, then the broadcasting antenna 112a may be adapted to provide VHF/UHF broadcasting service to the mobile terminal 116a.

In a somewhat similar manner, if the mobile terminal (MT) 116b is within an operating range of the VHF/UHF broadcasting antenna 112b and moves out of the latter's operating range and into an operating range of the broadcasting antenna 112a, then the VHF/UHF broadcasting antenna 112a may be adapted to provide VHF/UHF broadcasting service to the mobile terminal 116b. If the mobile terminal 116b subsequently moves back into the operating range of broadcasting antenna 112b, then the VHF/UHF broadcasting antenna 112b may be adapted to provide VHF/UHF broadcast services to the mobile terminal 116b.

The service provider 106 may comprise suitable interfaces, circuitry, logic and/or code that may be adapted to facilitate communication between the terrestrial broadcasting network 102 and the wireless communication network 104. In an illustrative embodiment of the invention the service provider 106 may be adapted to utilize its interfaces to facilitate exchange control information with the terrestrial broadcast network 102 and to exchange control information with the wireless service provider 104. The control information exchanged by the service provider 106 with the terrestrial broadcasting network 102 and the wireless communication network 104 may be utilized to control certain operations of the mobile terminals, the terrestrial broadcast network 102 and the wireless communication network 104.

In accordance with an embodiment of the invention, the service provider 106 may also comprise suitable interfaces, circuitry, logic and/or code that may be adapted to handle network policy decisions. For example, the service provider 106 may be adapted to manage a load on the terrestrial broadcast network 102 and/or a load on the wireless service provider network 104. Load management may be utilized to distribute the flow of information throughout the terrestrial broadcast network 102 and/or a load on the wireless service provider network 104. For example, if information is to be broadcasted via the wireless service provider network 104 to a plurality of mobile terminals within a particular cell handled by the base station 104a and it is determined that this may overload the wireless service provider network 104, then the terrestrial broadcast network 102 may be configured to broadcast the information to the mobile terminals.

The service provider 106 may also be adapted to handle certain types of service requests, which may have originated from a mobile terminal. For example, the mobile terminal 116a may request that information be delivered to it via a downlink VHF/UHF broadcast channel. However, a downlink VHF/UHF broadcast channel may be unavailable for the delivery of the requested information. As a result, the service provider 106 may route the requested information through an MBMS channel via the base station 104c to the mobile terminal 116a. The requested information may be acquired from the content source 114 and/or the portal 108. In another example, the mobile terminal 116b may request that information be delivered to it via a downlink cellular channel. However, the service provider 106 may determine that delivery of the information is not critical and/or the cheapest way to deliver to the mobile terminal 116b is via a downlink VHF/UHF broadcast channel. As a result, the service provider 106 may route the requested information from the portal 108 or content service 114 to the mobile terminal 116b. The service provider 106 may also have the capability to send at least a portion of information to be delivered to, for example, mobile terminal 116a via the VHF/UHF broadcast channel and a remaining portion of the information to be delivered via the cellular broadcast channel.

In an embodiment of the invention, the service provider 106 may be adapted to receive and process quality of service (QoS) related information from the mobile terminals 116a, 116b, the wireless service provider 104 and/or the broadcast service provider. In an embodiment of the invention, any one of the mobile terminals 116a, 116b may request that information have a certain QoS be delivered to via a specified part or any part that may have to capability to supply the requested information.

In another embodiment of the invention, the service provider 106 may be adapted to autonomously control the QoS that is provided to the mobile terminal 116a and 116b. In this regard, the service provider 106 may be adapted to monitor, for example, condition on link that may be utilized to communicate with the mobile terminals 116a, and 116b. For example, the service provider 106 may be request information related to RF channel conditions from each of the mobile terminals 116a, 116b, the wireless service provider 104 and/or the broadcast service provider 102.

The service provider 106 may also be adapted to acquire information regarding a load on the terrestrial broadcast network 102 and a load on the wireless service provider network 104. Accordingly, based on the determined load, the service provider 106 may be adapted to control how data may be routed over the terrestrial broadcast network 102 and/or the wireless service provider network 104 to utilizing QoS related information. For example, if the service provider 106 determines that the wireless service provider 104 is congested, then most of the requested information that is to be delivered to the mobile terminal 116a may be delivered via the terrestrial broadcast service provider 102. If the service provider 106 determines that the terrestrial broadcast service provider 102 is congested, then most of the requested information that is to be delivered to the mobile terminal 116a may be delivered via the wireless service provider 104. The service provider 106 may also be adapted to partition delivery of requested information to the mobile terminal 116a. In this regard, based on a load on the wireless service provider 104 and the terrestrial service provider 102, a portion of requested information may be routed through the wireless service provider 104 to the mobile terminal 116a and at least a remaining portion of the requested information may be routed through the terrestrial service provider 102 to the mobile terminal 116a.

The portal 108 may comprise suitable logic, circuitry and/or code that may be adapted to provide content media to the service provider 106 via one or more communication links. These communication links, although not shown, may comprise wired and/or wireless communication links. The content media that may be provided by the portal 108 may comprise audio, data, video or any combination thereof. In this regard, the portal 108 may be adapted to provide one or more specialized information services to the service provider 106.

The public switched telephone network (PSTN) 110 may be coupled to the MSC 118a. Accordingly, the MSC 118a may be adapted to switch calls originating from within the PSTN 110 to one or more mobile terminals serviced by the wireless service provider 104. Similarly, the MSC 118a may be adapted to switch calls originating from mobile terminals serviced by the wireless service provider 104 to one or more telephones serviced by the PSTN 110.

The information content source 114 may comprise a data carousel. In this regard, the information content source 114 may be adapted to provide various information services, which may comprise online data including audio, video and data content. The information content source 114 may also comprise file download, and software download capabilities.

In instances where a mobile terminal fails to acquire requested information from the information content source 114 or the requested information is unavailable, then the mobile terminal may acquire the requested information via, for example, a B-UMTS from the portal 108. The request may be initiated through an uplink cellular communication path.

The mobile terminals (MTs) 116a and 116b may comprise suitable logic, circuitry and/or code that may be adapted to handle the processing of uplink and downlink cellular channels for various access technologies and broadcast VHF/UHF technologies. In an exemplary embodiment of the invention, the mobile terminals 116a, 116b may be adapted to utilize one or more cellular access technologies such as GSM, GPRS, EDGE, CDMA, WCDMA, CDMA2000, HSDPA and MBMS (B-UMTS). The mobile terminal may also be adapted to receive and process VHF/UHF broadcast signals in the VHF/UHF bands. For example, a mobile terminal may be adapted to receive and process DVB-H signals. A mobile terminal may be adapted to request information via a first cellular service and in response, receive corresponding information via a VHF/UHF broadcast service. A mobile terminal may also be adapted to request information from a service provider via a cellular service and in response, receive corresponding information via a data service, which is provided via the cellular service. The mobile terminals may also be adapted to receive VHF/UHF broadcast information from either the base stations 104a, 104b, 104c, 104d or the VHF/UHF broadcast antennas 112a and 112b. In instances where a mobile terminal receives broadcast information from any of the base stations 104a, 104b, 104c, or 104d via a downlink MBMS communication channel, then the mobile terminal may communicate corresponding uplink information via an uplink cellular communication channel.

In one embodiment of the invention, a mobile terminal may be adapted to utilize a plurality of broadcast integrated circuits for receiving and processing VHF/UHF channels, and a plurality of cellular integrated circuits for receiving and processing cellular or PCS channels. In this regard, the plurality of cellular integrated circuits may be adapted to handle different cellular access technologies. For example, at least one of the cellular integrated circuits may be adapted to handle GSM, and at least one of the cellular integrated circuits may be adapted to handle WCDMA. For broadcast channels, each of the plurality of broadcast integrated circuits may be adapted to handle at least one VHF/UHF channel.

In another embodiment of the invention, a mobile terminal may be adapted to utilize a single broadcast integrated circuit for receiving and processing VHF/UHF channels, and a single cellular integrated circuit for receiving and processing cellular or PCS channels. In this regard, the single cellular integrated circuit may be adapted to handle different cellular access technologies. For example, at least one of the cellular integrated circuit may be adapted to handle GSM, and at least one of the cellular integrated circuits may be adapted to handle WCDMA. For broadcast channels, the single broadcast integrated circuit may be adapted to handle at least one VH/UHF channel. Each of the mobile terminals may comprise a single memory interface that may be adapted to handle processing of the broadcast communication information and processing of cellular communication information. In this regard, an uplink cellular communication path may be utilized to facilitate receiving of broadcast information via a broadcast communication path.

In another embodiment of the invention, a mobile terminal may be adapted to utilize a single integrated circuit for receiving and processing broadcast VHF/UHF channels, and for receiving and processing cellular or PCS channels. In this regard, the single broadcast and cellular integrated circuit may be adapted to handle different cellular access technologies. For example, the single integrated circuit may comprise a plurality of modules each of which may be adapted to receive and process a particular cellular access technology or a VHF/UHF broadcast channel. Accordingly, a first module may be adapted to handle GSM, a second module may be adapted to handle WCDMA, and a third module may be adapted to handle at least one VHF/UHF channel.

In operation, with reference to FIG. 1a, a mobile terminal 116a may request service via a wireless service provider network 104 with specified quality of service (QoS) criteria. The service provider network 106 may take the QoS request into consideration in determining how to establish the service to the mobile terminal 116a. The mobile terminal 116a may establish a communication to a service provider 106 via the wireless service provider network 104. The mobile terminal 116a may request content from the service provider 106 via the wireless service provider network 104. The service provider 106 may determine the QoS required to deliver the program to the mobile terminal 116a. If the service provider 106 determines that the QoS requirements to deliver the content to the mobile terminal 116a cannot be met via the wireless service provider network 104, the content may be delivered via the terrestrial broadcast network 102.

Upon determining that the program content is to be delivered via the terrestrial broadcast network 102, the service provider 106 may send a request to the terrestrial broadcast network 102 to communicate the content requested by the mobile terminal 116a. The terrestrial broadcast network 102 may reply to the service provider 106 indicating a VHF/UHF channel assignment, which may be utilized to broadcast the content. The service provider 106 may communicate to the mobile terminal 116a via the wireless service provider network 104 indicating that the desired content will be delivered via the terrestrial broadcast network 102 via the assigned VHF/UHF channel. The service provider 106 may initiate transfer of content to the terrestrial broadcast network 102. The mobile terminal 116a, may select the assigned VHF/UHF broadcast channel and begin reception of the content requested by the mobile terminal 116a. The mobile terminal 116a may terminate communication with the service provider 106 via the wireless service provider network 104.

Figure 1B:
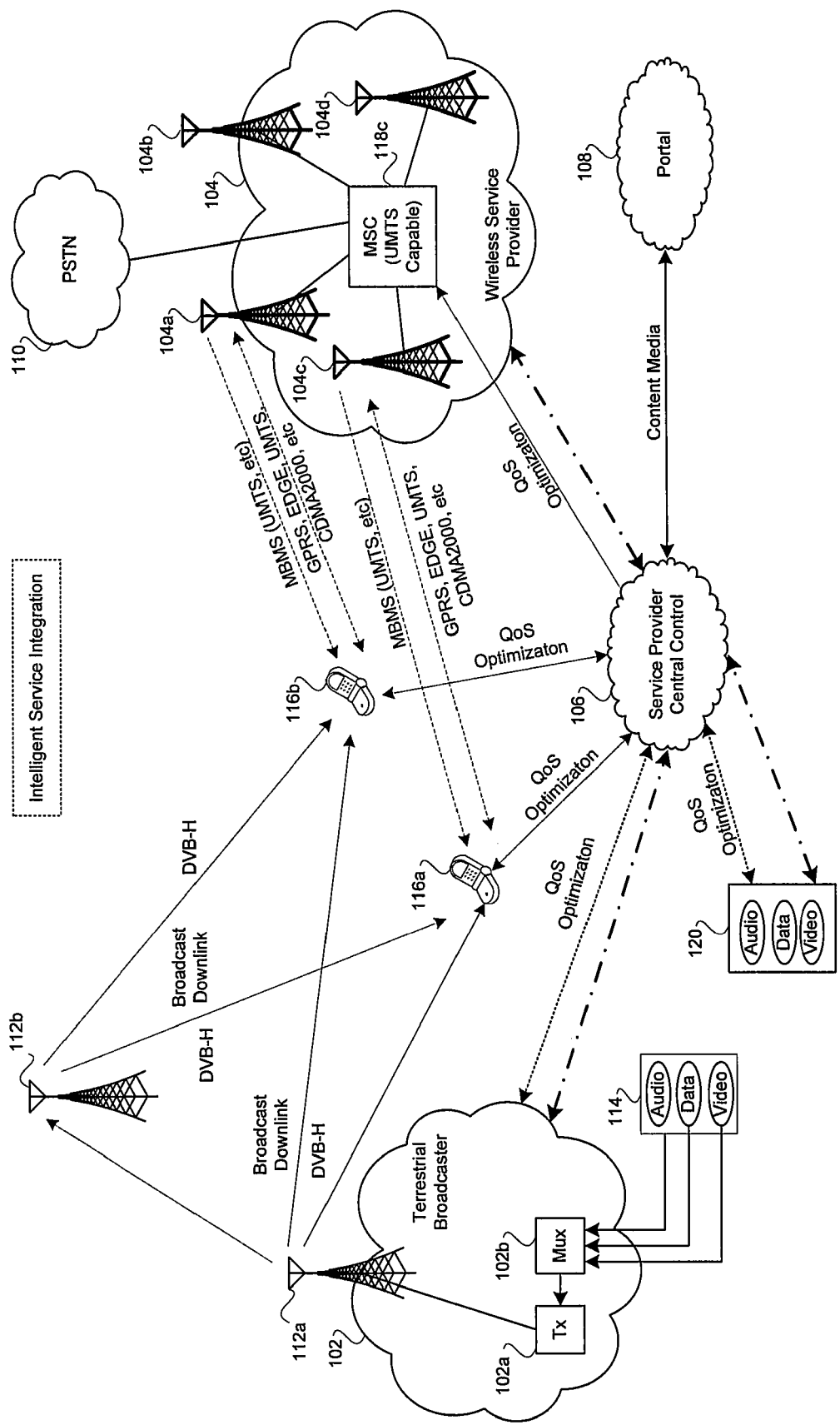
FIG. 1b is a block diagram of an alternative embodiment of the exemplary system of FIG. 1a for providing integrated services between a cellular network and a digital video broadcast network, in accordance with an embodiment of the invention.

FIG. 1b is a block diagram of an alternative embodiment of the exemplary system of FIG. 1a for providing integrated services between a cellular network and a digital video broadcast network, in accordance with an embodiment of the invention. Referring to FIG. 1b, there is shown terrestrial broadcaster network 102, wireless service provider network 104, service provider 106, portal 108, public switched telephone network 110, and mobile terminals (MTs) 116a and 116b. The terrestrial broadcaster network 102 may comprise transmitter (Tx) 102a, multiplexer (Mux) 102b, and VHF/UHF broadcast antennas 112a and 112b. Although VHF/UHF broadcast antenna 112b is illustrated separately from the terrestrial broadcast network 102, it may still be part of the terrestrial broadcast network 102. The wireless service provider network 104 may comprise mobile switching center (MSC) 118a, and a plurality of cellular base stations 104a, 104b, 104c, and 104d.

The system of FIG. 1b is somewhat similar to the FIG. 1a with the exception that FIG. 1b has the content source 114 located external to the terrestrial broadcast network 102. The content source 114, which may also be referred to as a data carousel, may comprise audio, data and video content. At least a portion of the audio, data and/or video content stored in the content source 114 may be linked so that if information cannot be retrieved from the content source 114, then it may be received from the portal 108. In the system of FIG. 1b, a provider other than the terrestrial broadcaster 102 may manage the content source 114. Notwithstanding, the audio, video and/or data from the content source 114 may still be multiplexed by the multiplexer 102b in the terrestrial broadcast network 114.

Figure 1C:
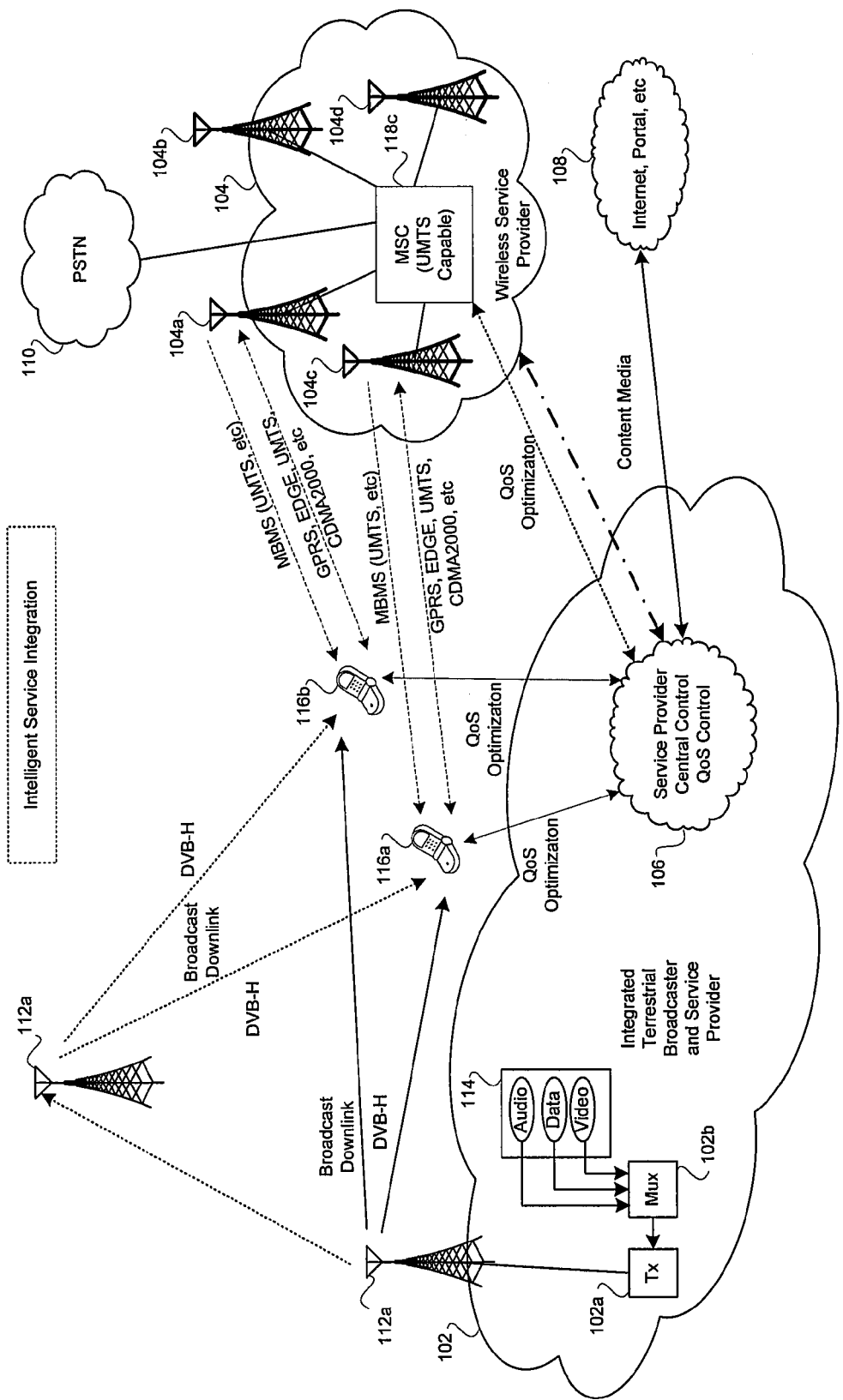
FIG. 1c is a block diagram of an alternative embodiment of the exemplary system of FIG. 1a for providing integrated services between a cellular network and a digital video broadcast network, in accordance with an embodiment of the invention.

FIG. 1c is a block diagram of an alternative embodiment of the exemplary system of FIG. 1a for providing integrated services between a cellular network and a digital video broadcast network, in accordance with an embodiment of the invention. Referring to FIG. 1c, there is shown terrestrial broadcaster network 102, wireless service provider network 104, portal 108, public switched telephone network 110, and mobile terminals (MTs) 116a and 116b. The terrestrial broadcaster network 102 may comprise transmitter (Tx) 102a, multiplexer (Mux) 102b, service provider 106, and VHF/UHF broadcast antennas 112a and 112b. The wireless service provider network 104 may comprise mobile switching center (MSC) 118a, and a plurality of cellular base stations 104a, 104b, 104c, and 104d.

The system of FIG. 1c is somewhat similar to the FIG. 1a with the exception that FIG. 1b has the service provider 106 co-located with the terrestrial broadcast network 102. In this regard, the terrestrial broadcast network 102 may control the functions of the service provider 106. Since the terrestrial broadcast network 102 controls the functions of the service provider, the broadcast services may be more efficiently provided to the mobile terminals via the MBMS path provided by the wireless service provider 104 and/or the VHF/UHF broadcast downlink path provided by the terrestrial broadcaster network 102. Hence, instead of having to send information to an externally located service provider, the integrated control and logic services provided the terrestrial broadcaster network 102 and service provider 106 may instantly make decisions of how best to handle information for a mobile terminal.

Figure 1D:
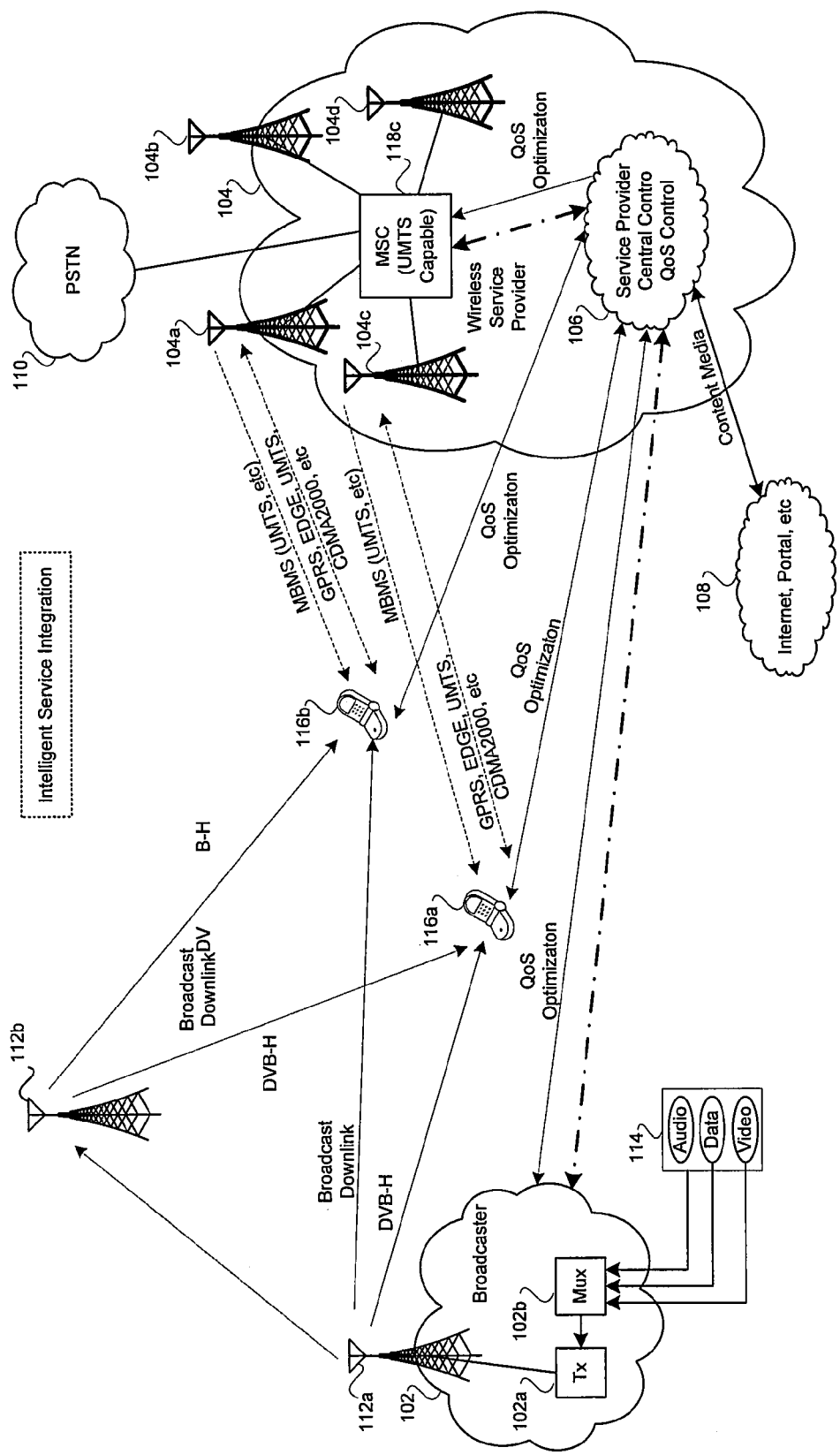
FIG. 1d is a block diagram of an alternative embodiment of the exemplary system of FIG. 1a for providing integrated services between a cellular network and a digital video broadcast network, in accordance with an embodiment of the invention.

FIG. 1d is a block diagram of an alternative embodiment of the exemplary system of FIG. 1a for providing integrated services between a cellular network and a digital video broadcast network, in accordance with an embodiment of the invention. Referring to FIG. 1d, there is shown terrestrial broadcaster network 102, wireless service provider network 104, portal 108, public switched telephone network 110, and mobile terminals (MTs) 116a and 116b. The terrestrial broadcaster network 102 may comprise transmitter (Tx) 102a, multiplexer (Mux) 102b, and VHF/UHF broadcast antennas 112a and 112b. The wireless service provider network 104 may comprise service provider 106, mobile switching center (MSC) 118a, and a plurality of cellular base stations 104a, 104b, 104c, and 104d.

The system of FIG. 1d is somewhat similar to the FIG. 1a with the exception that FIG. 1b has the service provider 106 co-located with the wireless service provider network 104. In this regard, the wireless service provider network 104 may control the functions of the service provider 106. Since the wireless service provider network 104 controls the functions of the service provider 106, the broadcast services may be more efficiently provided to the mobile terminals via the MBMS path provided by the wireless service provider 104 and/or the VHF/UHF broadcast downlink path provided by the terrestrial broadcaster network 102. Hence, instead of having to send information to an externally located service provider 106 as illustrated in FIG. 1a, the integrated control and logic services provided the service provider 106 may instantly make decisions of how best to handle communication of information for a mobile terminal.

In another embodiment of the invention, since many of the services provided by the service provider 106 may already be integrated into the wireless service provider's 104 infrastructure, then the complexity of the service provider functions may be significantly reduced. For example, the wireless service provider 104, the latter of which already has the pertinent infrastructure in place, may now handle operation administration maintenance and provisioning (OAM&P) functions, which may be required by the service provider 106. Since the uplink capabilities are inherent in only the wireless service provider network 104, and the service provider function are also located within the service provider network 106, the uplink capabilities for the mobile stations 116a, 116b may be more efficiently managed from within the wireless service provider network 104.

The FIGS. 1a-d illustrate intelligent integrated services between the cellular network and the digital video broadcast network. However, another embodiment may be where there is high integration between the cellular network and the digital video broadcast network without the intelligent service capability. U.S. application Ser. No. 11/010,461 is filed on the even date herewith and discloses the alternate embodiment.

Figure 1E:
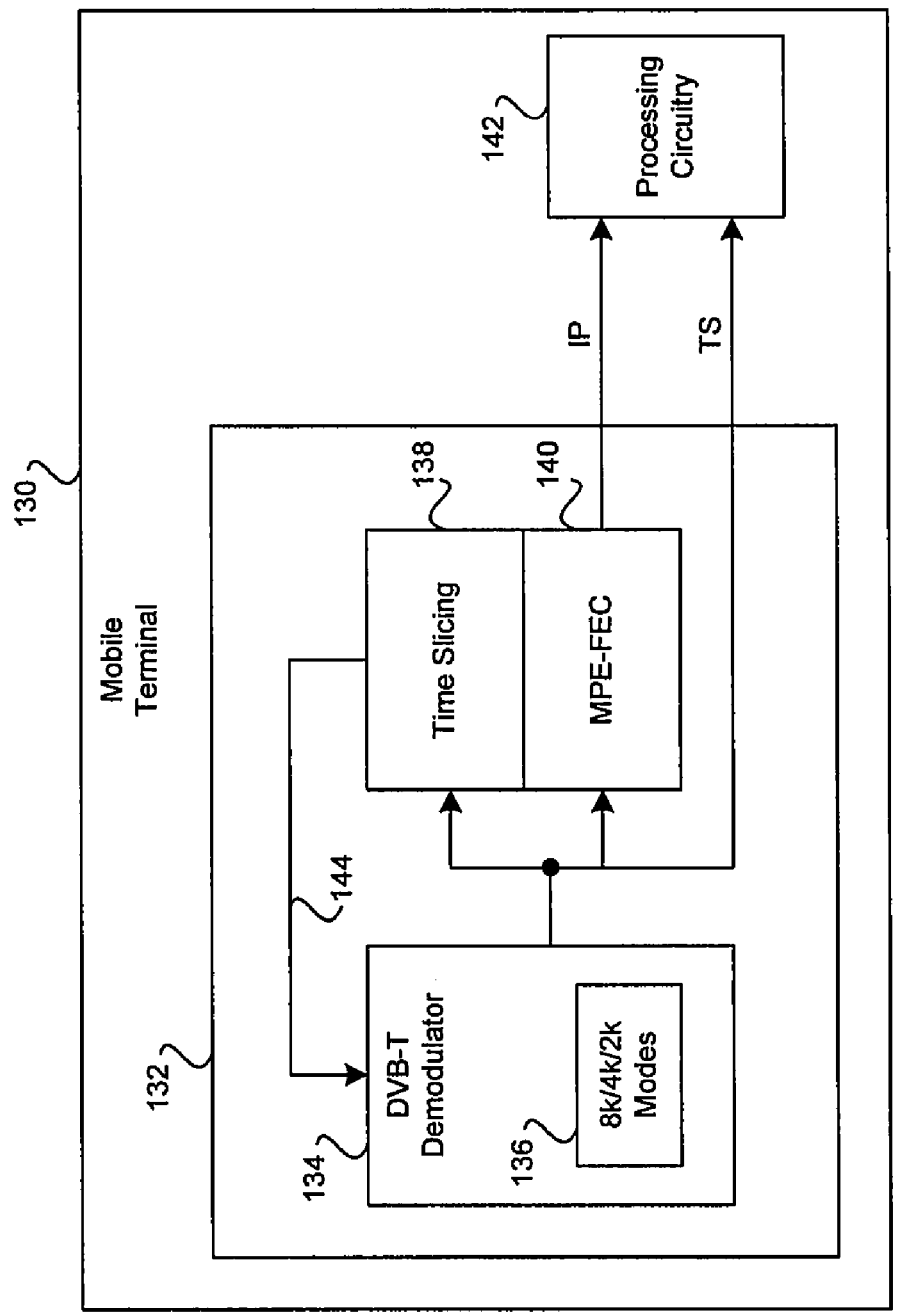
FIG. 1e is a high-level block diagram of exemplary DVB-H receiver circuitry in a mobile terminal, which may be utilized in connection with an embodiment of the invention.

FIG. 1e is a high-level block diagram of exemplary DVB-H receiver circuitry in a mobile terminal, which may be utilized in connection with an embodiment of the invention. Referring to FIG. 1e, there is shown a mobile terminal 130. The mobile terminal 130 may comprise a DVB-H demodulator 132 and processing circuitry block 142. The DVB-H demodulator block 132 may comprise a DVB-T demodulator 134, time slicing block 138, and MPE-FEC block 140.

The DVB-T demodulator 134 may comprise suitable circuitry, logic and/or code that may be adapted to demodulate a terrestrial DVB signal. In this regard, the DVB-T demodulator 134 may be adapted to downconvert a received DVB-T signal to a suitable bit rate that may be handled by the mobile terminal 130. The DVB-T demodulator may be adapted to handle 2k, 4k and/or 8k modes.

The time slicing block 138 may comprise suitable circuitry, logic and/or code that may be adapted to minimize power consumption in the mobile terminal 130, particularly in the DVB-T demodulator 134. In general, time slicing reduces average power consumption in the mobile terminal by sending data in bursts via much higher instantaneous bit rates. In order to inform the DVB-T demodulator 134 when a next burst is going to be sent, a delta indicating the start of the next burst is transmitted within a current burst. During transmission, no data for an elementary stream (ES) is transmitted so as to allow other elementary streams to optimally share the bandwidth. Since the DVB-T demodulator 134 knows when the next burst will be received, the DVB-T demodulator 134 may enter a power saving mode between bursts in order to consume less power. Reference 144 indicates a control mechanism that handles the DVB-T demodulator 134 power via the time slicing block 138. The DVB-T demodulator 134 may also be adapted to utilize time slicing to monitor different transport streams from different channels. For example, the DVB-T demodulator 134 may utilize time slicing to monitor neighboring channels between bursts to optimize handover.

The MPE-FEC block 140 may comprise suitable circuitry, logic and/or code that may be adapted to provide error correction during decoding. On the encoding side, MPE-FEC encoding provides improved carrier to noise ratio (C/N), improved Doppler performance, and improved tolerance to interference resulting from impulse noise. During decoding, the MPE-FEC block 140 may be adapted to determine parity information from previously MPE-FEC encoded datagrams.

As a result, during decoding, the MPE-FEC block 140 may generate datagrams that are error-free even in instances when received channel conditions are poor. The processing circuitry block 142 may comprise suitable processor, circuitry, logic and/or code that may be adapted to process IP datagrams generated from an output of the MPE-FEC block 140. The processing circuitry block 142 may also be adapted to process transport stream packets from the DVB-T demodulator 134.

In operation, the DVB-T demodulator 134 may be adapted to receive an input DVB-T RF signal, demodulate the received input DVB-T RF signal so as to generate data at a much lower bit rate. In this regard, the DVB-T demodulator 134 recovers MPEG-2 transport stream (TS) packets from the input DVB-T RF signal. The MPE-FEC block 140 may then correct any error that may be located in the data and the resulting IP datagrams may be sent to the processing circuitry block 142 for processing. Transport stream packets from the DVB-T demodulator 134 may also be communicated to the processing circuitry block 142 for processing.

Figure 1F:
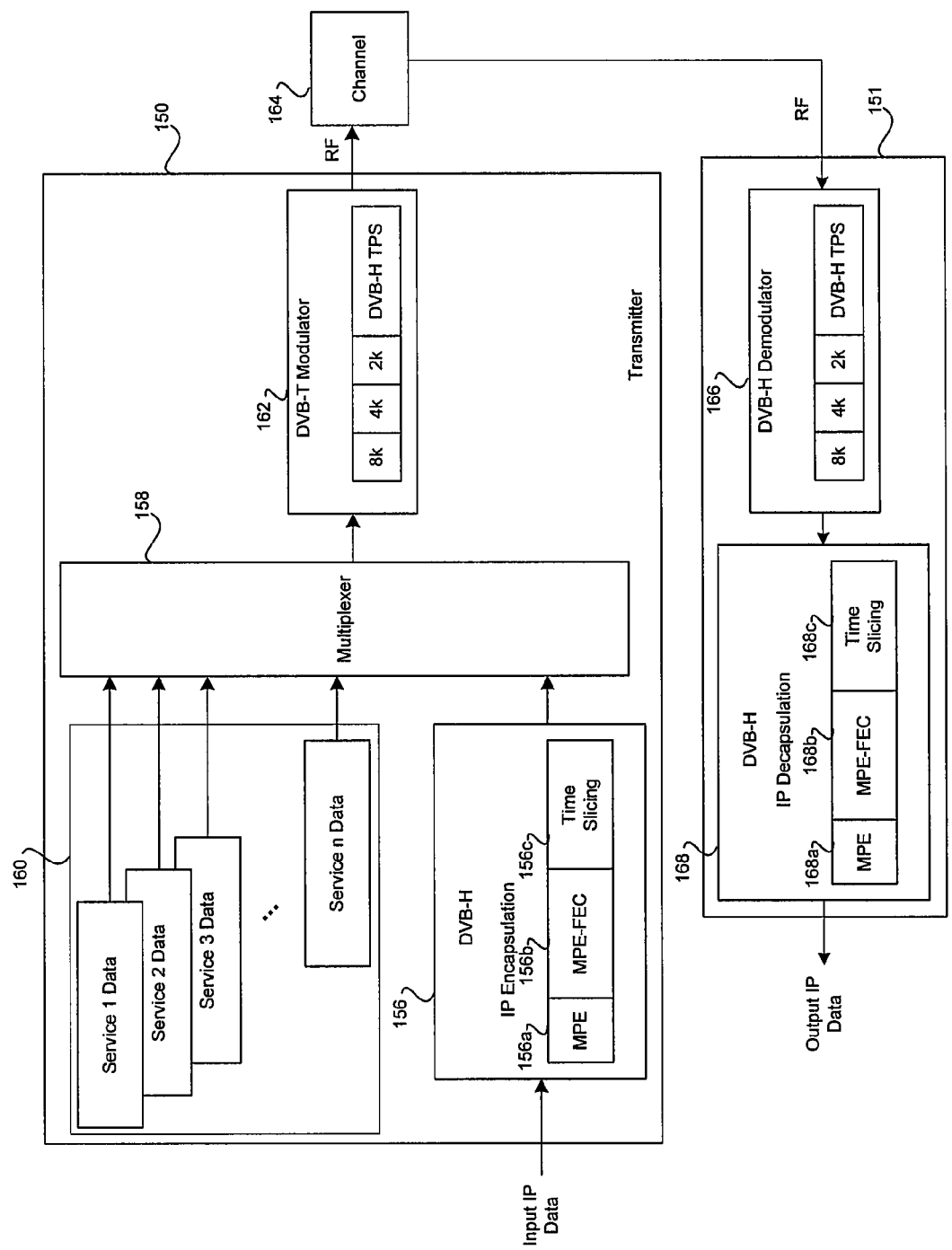
FIG. 1f is a block diagram illustrating the sharing of a multiplexer (MUX) by a plurality of MPEG2 services, which may be utilized in connection with an embodiment of the invention.

FIG. 1f is a block diagram illustrating the sharing of a multiplexer (MUX) by a plurality of MPEG2 services, which may be utilized in connection with an embodiment of the invention. Referring to FIG. 1f, there is shown a transmitter block 150, a receiver block 151 and a channel 164. The transmitter block 150 may comprise a DVB-H encapsulator block 156, a multiplexer 158, and a DVB-T modulator 162. Also shown associated with the transmitter block 150 is a plurality of service data collectively referenced as 160. The receiver block 151 may comprise a DVB-H demodulator block 166 and a DVB-H decapsulation block 168.

The DVB-H encapsulator block 156 may comprise MPE block 156a, MPE-FEC block 156b and time slicing block 156c.

The multiplexer 156 may comprise suitable logic circuitry and/or code that may be adapted to handle multiplexing of IP encapsulated DVB-H data and service data. The plurality of service data collectively referenced as 160 may comprise MPEG-2 formatted data, which may comprise for example, audio, video and/or data.

The DVB-T modulator 162 may comprise suitable logic circuitry and/or code that may be adapted to generate an output RF signal from the transmitter block 150.

The DVB-H demodulator block 166 associated with the receiver block 151 is similar to the DVB-H demodulator block 132 of FIG. 1e. The DVB-H decapsulation block 168 may comprise MPE block 168a, MPE-FEC block 168b and time slicing block 168c. The DVB-H decapsulation block 168 may comprise suitable logic, circuitry and/or code that may be adapted decapsulate the IP data that was encapsulated and multiplexed by the transmitter block 150. The output of the DVB-H demodulator 166 is the transport stream packets, which comprised the multiplexed output generated by the multiplexer 158.

Figure 2A:
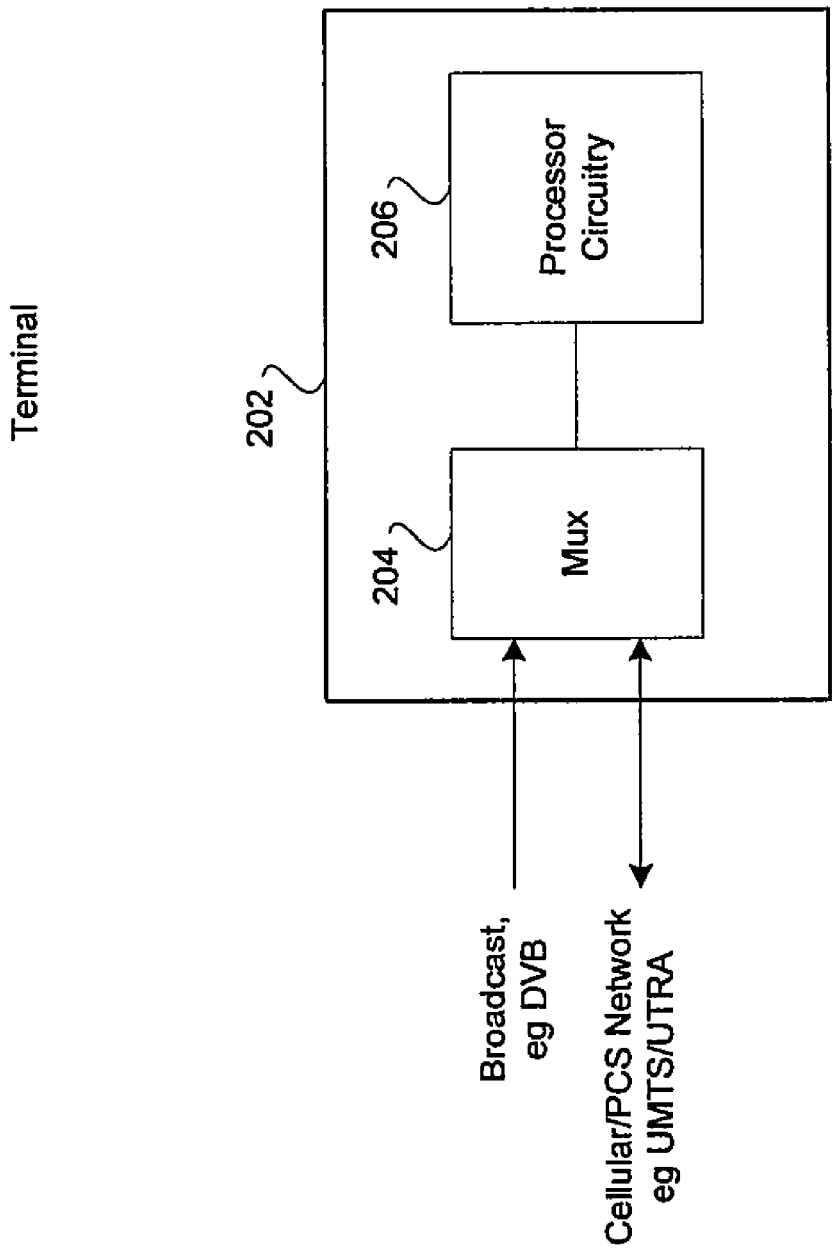
FIG. 2a is a block diagram of a mobile terminal that is adapted to receive VHF/UHF broadcasts and cellular communications, in accordance with an embodiment of the invention.

FIG. 2a is a block diagram of a mobile terminal that is adapted to receive VHF/UHF broadcasts and cellular communications, in accordance with an embodiment of the invention. Referring to FIG. 2a, there is shown mobile terminal (MT) or handset 202. The mobile terminal 202 may comprise multiplexer (MUX) 204 and processing circuitry 206.

The multiplexer 204 may comprise suitable logic circuitry and/or code that may be adapted to multiplex incoming signals, which may comprise VHF/UHF broadcast channel and at least one cellular channel. The cellular channel may be within the range of both cellular and PCS frequency bands.

The processing circuitry 206 may comprise, for example, an RF integrated circuit (RFIC) or RF front end (RFFE). In this regard, the processing circuitry 206 may comprise at least one receiver front end (RFE) circuit. A first of these circuits may be adapted to handle processing of the VHF/UHF broadcast channel and a second of these circuits may be adapted to handle a cellular channel. In an embodiment of the invention, a single RFIC may comprise a plurality of RFE processing circuits, each of which may be adapted to process a particular cellular channel. Accordingly, a single RFIC comprising a plurality of cellular RFE processing circuits may be adapted to handle a plurality of cellular channels. In one embodiment of the invention, a plurality of VHF/UHF RFE processing circuits may be integrated in a single RFIC. In this regard, a mobile terminal may be adapted to simultaneously handle a plurality of different VHF/UHF channels. For example, a mobile terminal may be adapted to simultaneously receive a first VHF/UHF channel bearing video and a second VHF/UHF channel bearing audio.

Figure 2B:
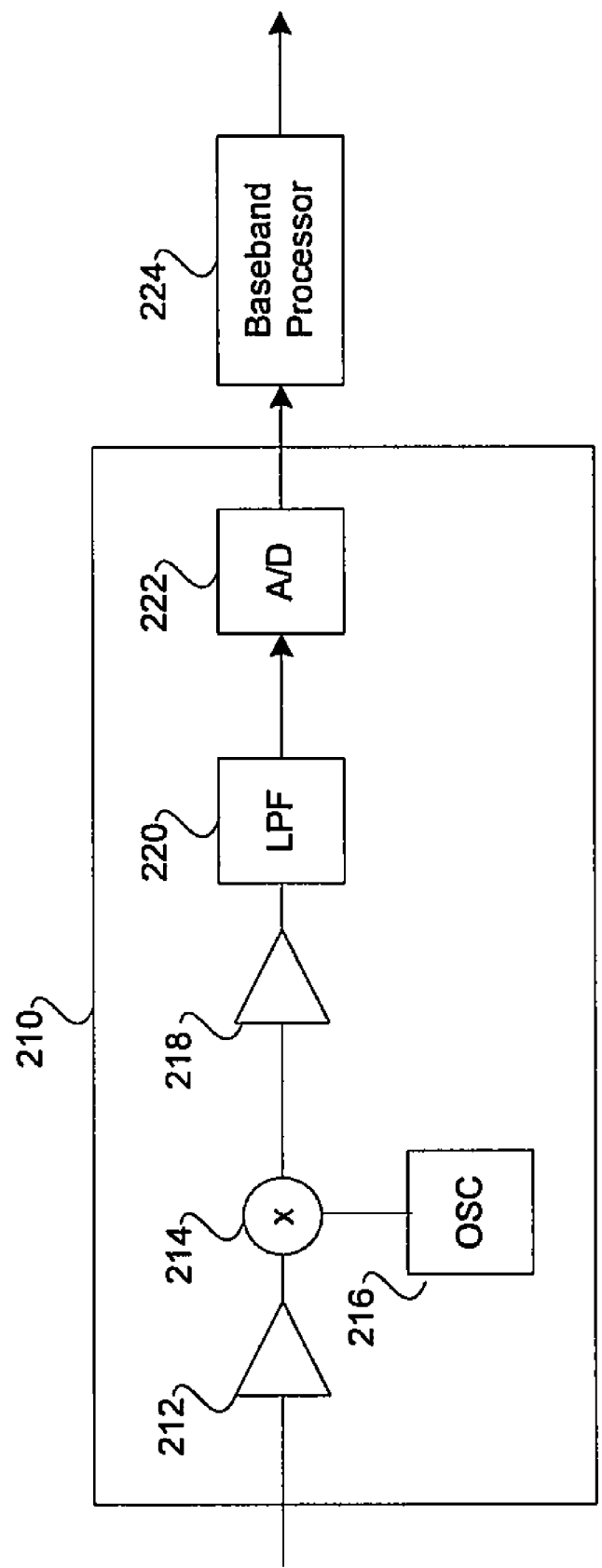
FIG. 2b is a block diagram illustrating receive processing circuit of an RF integrated circuit (RFIC), in accordance with an embodiment of the invention.

FIG. 2b is a block diagram illustrating receive processing circuit of an RF integrated circuit (RFIC), in accordance with an embodiment of the invention. Referring to FIG. 2b, there is shown antenna 211, receiver front end (RFE) circuit 210, and baseband processing block 224. The receiver front end (RFE) circuit 210 may comprise a low noise amplifier (LNA) 212, a mixer 214, an oscillator 216, a low noise amplifier or amplifier or amplifier 218, a low pass filter 220 and an analog-to-digital converter (A/D) 222.

The antenna 211 may be adapted to receive at least one of a plurality of signals. For example, the antenna 211 may be adapted to receive a plurality of signals in the GSM band, a plurality of signals in the WCDMA and/or a plurality of signals in the VHF/UHF band. U.S. application Ser. No. 11/010,883 16343US01), U.S. application Ser. No. 11/011,006 16344US01), U.S. application Ser. No. 11/010,487 16345US01), all of which are filed on even date herewith and disclose various antenna configurations that may be utilized for a plurality of operating frequency bands.

The receiver front end (RFE) circuit 210 may comprise suitable circuitry, logic and/or code that may be adapted to convert a received RF signal down to baseband. An input of the low noise amplifier 212 may be coupled to the antenna 211 so that it may receive RF signals from the antenna 211. The low noise amplifier 212 may comprise suitable logic, circuitry, and/or code that may be adapted to receive an input RF signal from the antenna 211 and amplify the received RF signal in such a manner that an output signal generated by the low noise amplifier 212 has a very little additional noise.

The mixer 214 in the RFE circuit 210 may comprise suitable circuitry and/or logic that may be adapted to mix an output of the low noise amplifier 212 with an oscillator signal generated by the oscillator 216. The oscillator 216 may comprise suitable circuitry and/or logic that may be adapted to provide a oscillating signal that may be adapted to mix the output signal generated from the output of the low noise amplifier 212 down to a baseband. The low noise amplifier (LNA) or amplifier 218 may comprise suitable circuitry and/or or logic that may be adapted to low noise amplify and output signal generated by the mixer 214. An output of the low noise amplifier or amplifier 218 may be communicated to the low pass filter 220. The low pass filter 220 may comprise suitable logic, circuitry and/or code that may be adapted to low pass filter the output signal generated from the output of the low noise amplifier 220. The low pass filter block 220 retains a desired signal and filters out unwanted signal components such as higher signal components comprising noise. An output of the low pass filter 220 may be communicated to the analog-digital-converter for processing.

The analog-to-digital converter (A/D) 222 may comprise suitable logic, circuitry and/or code that may be adapted to convert the analog signal generated from the output of the low pass filter 220 to a digital signal. The analog-to-digital converter 222 may generate a sampled digital representation of the low pass filtered signal that may be communicated to the baseband-processing block 224 for processing. The baseband processing block 224 may comprise suitable logic, circuitry and/or code that may be adapted to process digital baseband signals received from an output of the A/D 222. Although the A/D 222 is illustrated as part of the RFE circuit 210, the invention may not be so limited. Accordingly, the A/D 222 may be integrated as part of the baseband processing block 224. In operation, the RFE circuit 210 is adapted to receive RF signals via antenna 211 and convert the received RF signals to a sampled digital representation, which may be communicated to the baseband processing block 224 for processing.

Figure 2C:
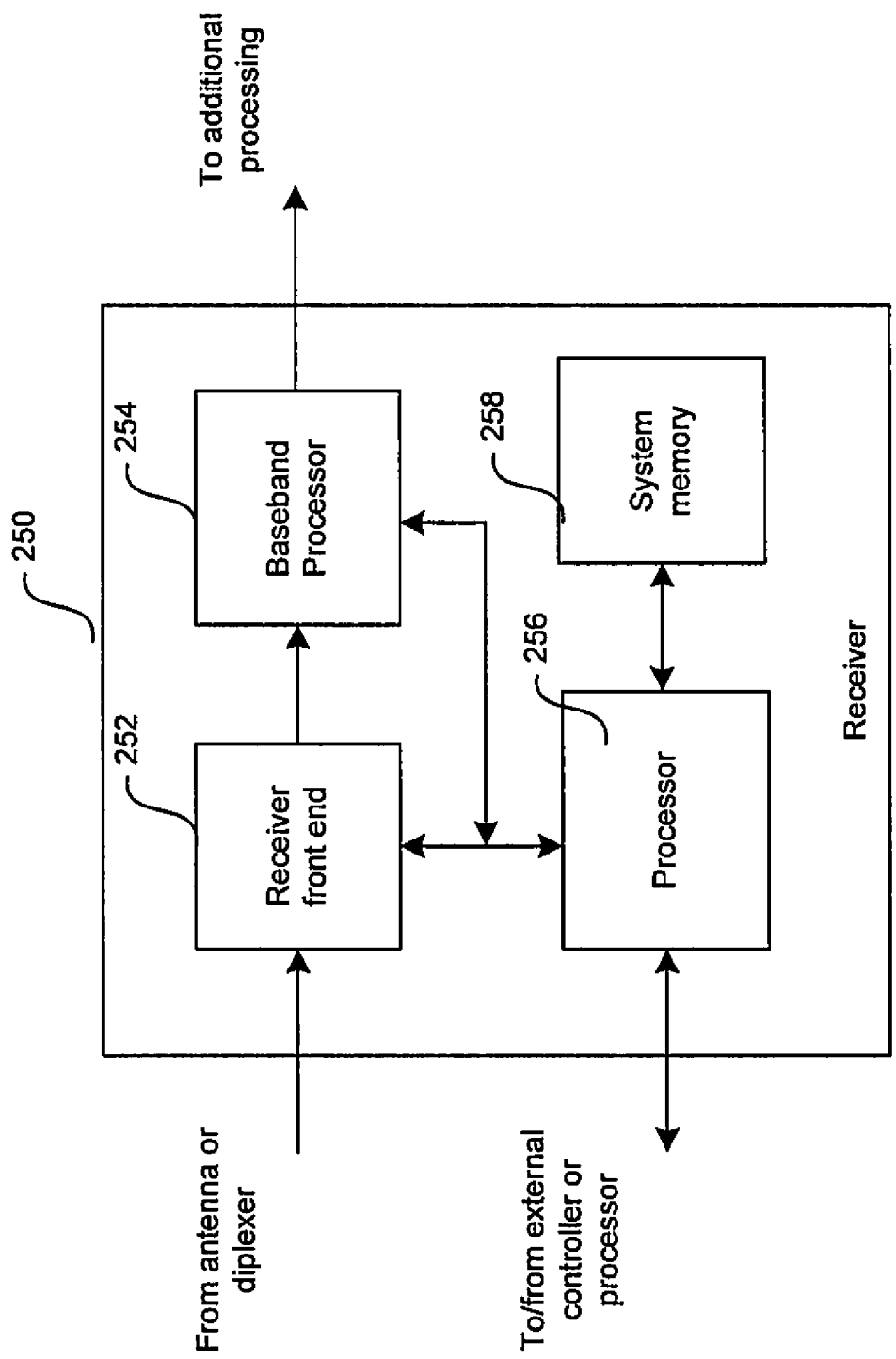
FIG. 2c is a block diagram of exemplary RF receiver system, in accordance with an embodiment of the invention.

FIG. 2c is a block diagram of exemplary RF receiver system, in accordance with an embodiment of the invention. Referring to FIG. 2c, the RF receiver system 250 may comprise a receiver front end 252, a baseband processor 254, a processor 256, and a system memory 258. The receiver front end 252 may comprise suitable logic, circuitry, and/or code that may be adapted to receive an RF signal. The receiver front end 252 may be coupled to an external antenna for signal reception and may demodulate a received RF signal before further processing. Moreover, the receiver front end 252 may comprise other functions, for example, filtering the received RF signal, amplifying the received RF signal, and/or downconverting the received RF signal to an analog baseband signal. The receiver front end 252 may also convert the analog baseband signal to a digital baseband signal.

The baseband processor 254 may comprise suitable logic, circuitry, and/or code that may be adapted to process received baseband signals from the receiver front end 252. The processor 256 may comprise suitable logic, circuitry, and/or code that may be adapted to control the operations of the receiver front end 252 and/or the baseband processor 254. For example, the processor 256 may be utilized to update and/or modify programmable parameters and/or values in a plurality of components, devices, and/or processing elements in the receiver front end 252 and/or the baseband processor 254. Control and/or data information may be transferred from at least one controller and/or processor external to the RF receiver system 250 to the processor 256. Similarly, the processor 256 may transfer control and/or data information to at least one controller and/or processor external to the RF receiver system 250.

The processor 256 may utilize the received control and/or data information to determine a mode of operation for the receiver front end 252. For example, the processor 156 may select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 258 via the controller/processor 256. This information stored in system memory 258 may be transferred to the receiver front end 252 from the system memory 258 via the controller/processor 256. The system memory 258 may comprise suitable logic, circuitry, and/or code that may be adapted to store a plurality of control and/or data information, including parameters needed to calculate frequencies and/or gain, and/or the frequency value and/or gain value.

Figure 3A:
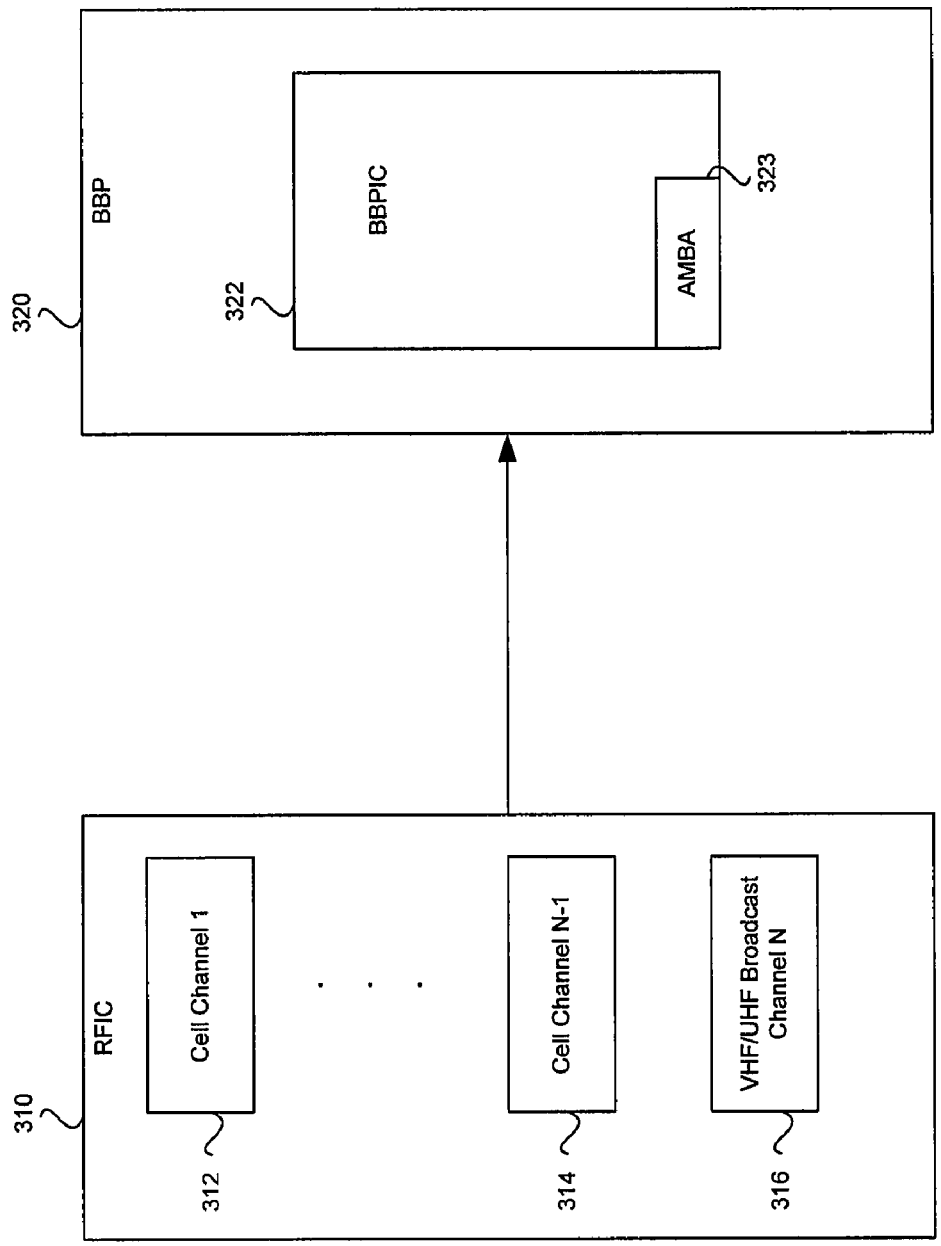
FIG. 3a is a high-level block diagram illustrating exemplary radio frequency integrated circuit (RFIC) and baseband processor (BBP) configuration that may be utilized in connection with an embodiment of the invention.

FIG. 3a is a high-level block diagram illustrating exemplary radio frequency integrated circuit (RFIC) and baseband processor (BBP) configuration that may be utilized in connection with an embodiment of the invention. Referring to FIG. 3a, there is shown a RFIC 310 and a BBP 320. The RFIC 310 may also be referred to as a RF front end (RFFE) and may comprise at least one receiver front end (RFE) processing circuit adapted to process a cellular channel and at least one receiver front end (RFE) processing circuit adapted to process a VHF/UHF broadcast channel. In an embodiment of the invention, the RFIC 310 may comprise a plurality of receiver front ends (RFEs) 312 . . . 314, and 316. The BBP 320 may comprise a BBP integrated circuit (BBPIC) 322, and the BBPIC 322 may comprise an advanced microcontroller bus architecture (AMBA) bus interface 323. The RFIC 310 may communicate signals to the BBP 320.

Each of the plurality of RFEs 312, . . . , 314, and 316 in the RFIC 310 may be substantially similar to the RFE 210 illustrated in FIG. 2b and may function in a similar manner. Each of the plurality of RFEs 312 . . . 314, and 316 may be adapted to receive and process RF signals based on at least one of a plurality of wireless communication standards, for example, GSM, UMTS, WCDMA, CDMA2000, EDGE, DVB-H, or other access technology. A RFE may comprise circuitry that may be adapted to receive RF signals and generate an output comprising a digital baseband signal that may be communicated to the BBPIC 322 in the BBP 320. The BBPIC 322 may comprise suitable logic, circuitry and/or code that may be adapted to receive and process the digital baseband signals from the RFIC 310. The processed signal from the BBPIC 322 may be communicated to at least one of a plurality of devices, for example, a visual display or the speaker.

The AMBA bus interface 323 may comprise suitable logic, circuitry and/or code that may be adapted to communicate with other processors, for example, a central processor unit (CPU) and/or digital signal processors (DSPs). By utilizing the AMBA bus interface 323, the BBPIC 322 may exchange information, for example, commands and/or data, with other processors, for example, processor 256 (FIG. 2c), such that desired functionalities may be executed. For example, the BBPIC 322 may receive a digital file of a photograph and may store the digital file in memory, for example, system memory 258 (FIG. 2c). The BBPIC 322 may then communicate the parameters of the digital file, for example, the start address in the memory where the digital file may be stored, the size of the digital file, etc., to the processor 256. The processor 256 may process user input and may retrieve the digital file of the photograph for output on the visual display.

In operation, the plurality of RFEs 312 . . . 314, and 316 may receive and process a plurality of RF signals. Each of the plurality of RFEs 312 . . . 314, and 316 may downconvert one of the plurality of RF signals to an analog baseband signal, and further convert the analog baseband signal to a digital baseband signal. For example, the plurality of RFEs 312, . . . , 314 may be adapted to receive and process cellular channels 1 . . . N–1, where cellular channel 1 may be UMTS signal and cellular channel N–1 may be WCDMA signal. RFE 316 may be adapted to receive and process a VHF/UHF broadcast channel. The VHF/UHF broadcast channel may be transmitted utilizing the DVB-H standard. A digital baseband signal may then be communicated to the BBPIC 322, and the BBPIC 322 may process the digital baseband signal. The BBPIC 322 may also communicate with the processor 256 via the AMBA bus interface 323 with regard to the status of the processed signal, which the BBPIC 322 may have stored to a memory location. The processor 256 may retrieve the file and execute appropriate steps, for example, display the photograph as in the example above.

Figure 3B:
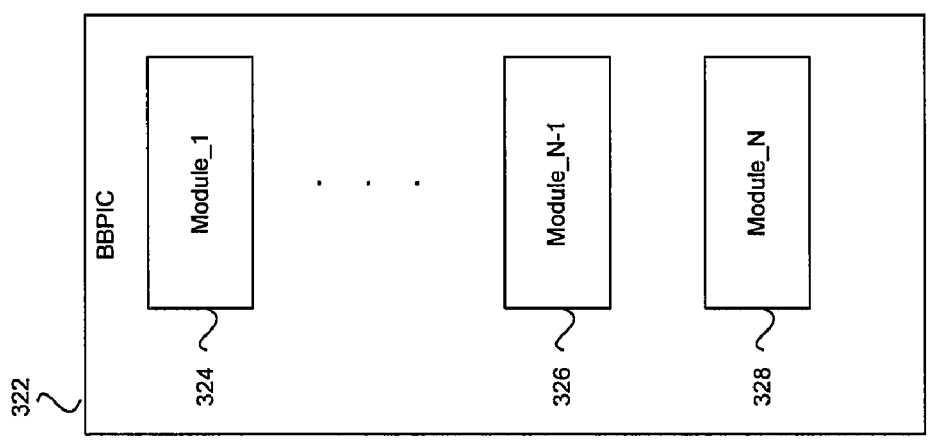
FIG. 3b is a block diagram illustrating exemplary baseband processor integrated circuit (BBPIC), such as, for example, the BBPIC of FIG. 3a, in accordance with an embodiment of the invention.

FIG. 3b is a block diagram illustrating exemplary baseband processor integrated circuit (BBPIC), such as, for example, the BBPIC of FIG. 3a, in accordance with an embodiment of the invention. Referring to FIG. 3b, there is shown a plurality of baseband processing modules 324, . . . , 326, and 328. The plurality of baseband processing modules 324, . . . , 326, and 328 may comprise suitable logic, circuitry and/or code that may be adapted to process at least one of a plurality of baseband signals. The plurality of baseband signals may have been converted from RF signals that may have been transmitted by systems that may comply with at least one of a plurality of cellular communication standards and/or VHF/UHF broadcast standard. Examples of cellular communication standards may be GSM, GPRS, EDGE, wideband CDMA (WCDMA), CDMA2000, HSDPA, and multiple broadcast/multicast service (MBMS). Examples of the VHF/UHF broadcast standards may be DVB, ATSC and ISDB.

In operation, the BBPIC 322 may receive a plurality of digital baseband signals from the RFIC 310 (FIG. 3a). The plurality of baseband processing modules 324, . . . , 326, and 328 may process at least one of the digital baseband signals, and the processed signals may be communicated to at least one of a plurality of devices, for example, a speaker or visual display.

Figure 3C:
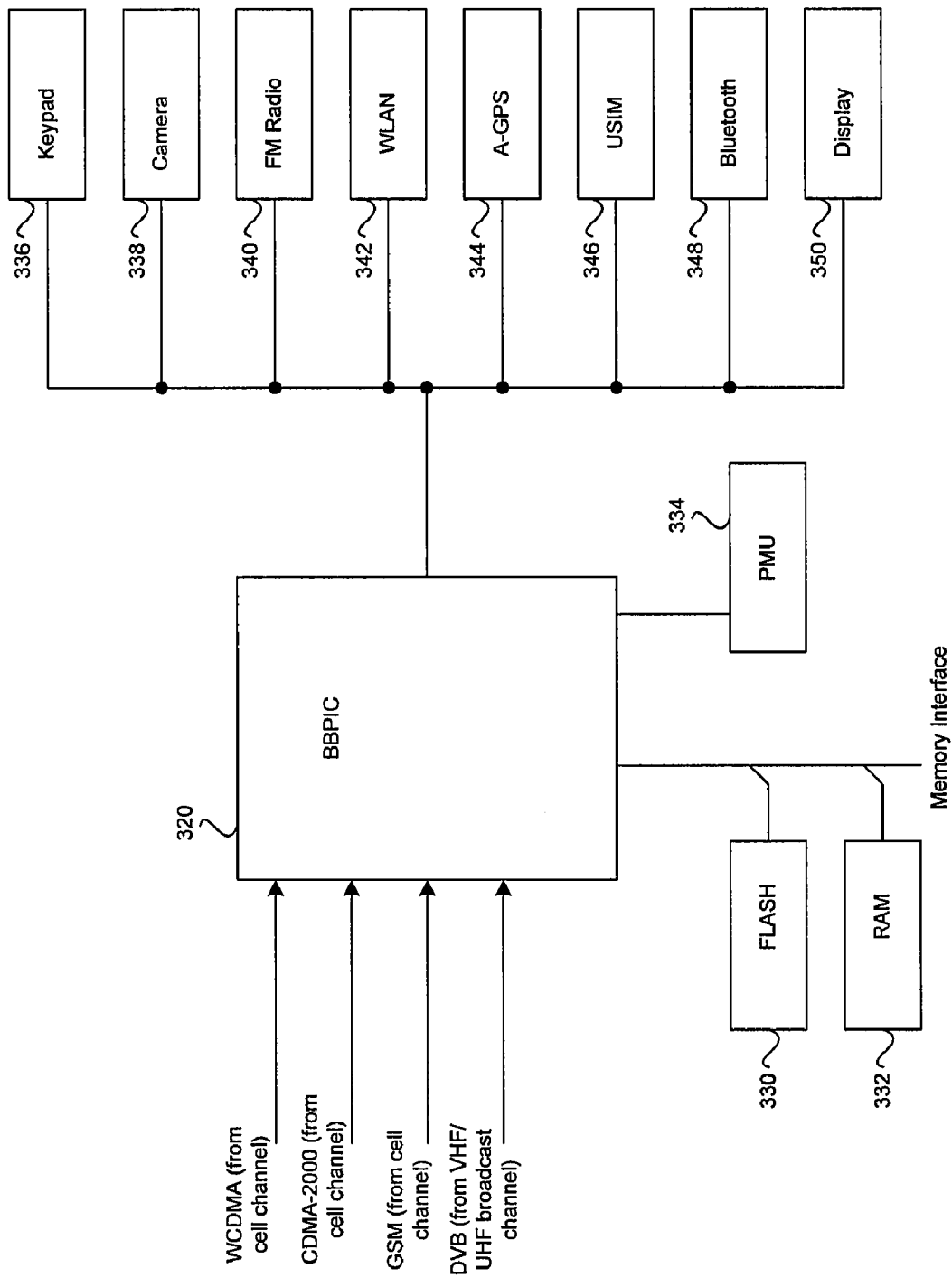
FIG. 3c is a block diagram illustrating exemplary coupling of the BBPIC of FIG. 3a to a plurality of peripherals, in accordance with an embodiment of the invention.

FIG. 3c is a block diagram illustrating an exemplary coupling of the BBPIC of FIG. 3a to a plurality of peripherals, in accordance with an embodiment of the invention. Referring to FIG. 3c, there is shown a BBPIC 320, a FLASH memory 330, random access memory (RAM) 332, a power management unit (PMU) 334, and a plurality of peripherals 336, 338, 340, 342, 344, 346, 348, and 350. The BBPIC 320 may be coupled to the FLASH memory 330 and the RAM 332 via a memory interface, to the PMU 334 via a control interface, and to the plurality of peripherals 336, 338, 340, 342, 344, 346, 348, and 350 via a peripheral interface. Additionally, the BBPIC 320 may receive inputs signals, for example, digital baseband signals from, for example, the RFIC 310 (FIG. 3a).

The FLASH memory 330 may comprise suitable logic and/or circuitry that may be adapted to store data and/or code in a non-volatile manner, where each memory address may be written multiple times, and the contents of each memory address may be randomly accessed. The RAM 332 may comprise suitable logic and/or circuitry that may be adapted for storing data and/or code in a volatile manner, where each memory address may be written multiple times, and each memory address may be randomly accessed for read and write operations. The PMU 334 may comprise suitable logic, circuitry and/or code that may be adapted for controlling power usage by various devices. The plurality of peripherals 336, 338, 340, 342, 344, 346, 348, and 350 may provide input to or receive output from the BBPIC 320. For example, the peripheral 342 may provide communication access to a wireless local area network (WLAN) and the peripheral 348 may provide communication access to Bluetooth devices. The peripheral 346 may be a universal subscriber identity module (USIM), in which the USIM may contain relevant information that enables access onto a subscribed operator's GSM and/or UMTS network.

In operation, the BBPIC 320 may receive digital baseband signals from the RFIC 310 (FIG. 3a), and these signals may be processed as described in FIG. 3b. Using the example from FIG. 3b, the processed signal may result in a digital file of a photograph. The photograph file may be stored in RAM 332. The user of a device that may implement an embodiment of the invention may wish to save the digital file of the photograph to FLASH memory 330 so that the digital file of the photograph will not be lost when the device is powered off. The BBPIC 320 may communicate with the FLASH memory 330 and the RAM 332 via a memory interface, for example, a serial random access memory (SRAM) bus. The user of the device may also send the photograph file from the FLASH memory 330 to another device, for example, a printer on a computer network via the peripheral 342. The peripheral 342 may be a WLAN interface that provides access to the WLAN, and hence to the printer.

The PMU 334 may monitor the baseband processing modules 324, . . . , 326, and 328 (FIG. 3b) and may indicate to the BBPIC 320 that RF devices, for example, amplifiers, or analog-to-digital converters, associated with at least one baseband processing module may be powered down, or placed in stand-by mode. This may occur when the PMU 334 does not detect any valid signal being processed by at least one of the baseband processing modules 324, . . . , 326, and 328. The PMU 334 may indicate to the BBPIC 320 to power up, or placed in active mode, the RF devices that may have been placed in stand-by mode. The PMU 334 may then monitor the relevant baseband processing module to try to detect a valid signal. If there still is no valid signal detected, then the RF devices associated with the baseband processing module may enter the stand-by mode. If there is a valid signal detected, then the RF devices associated with the baseband processing module may be left in active mode. The PMU 334 and the BBPIC 320 may communicate with each other via a bus, for example, the inter-integrated circuit ($I^2C$) bus.

Figure 3D:
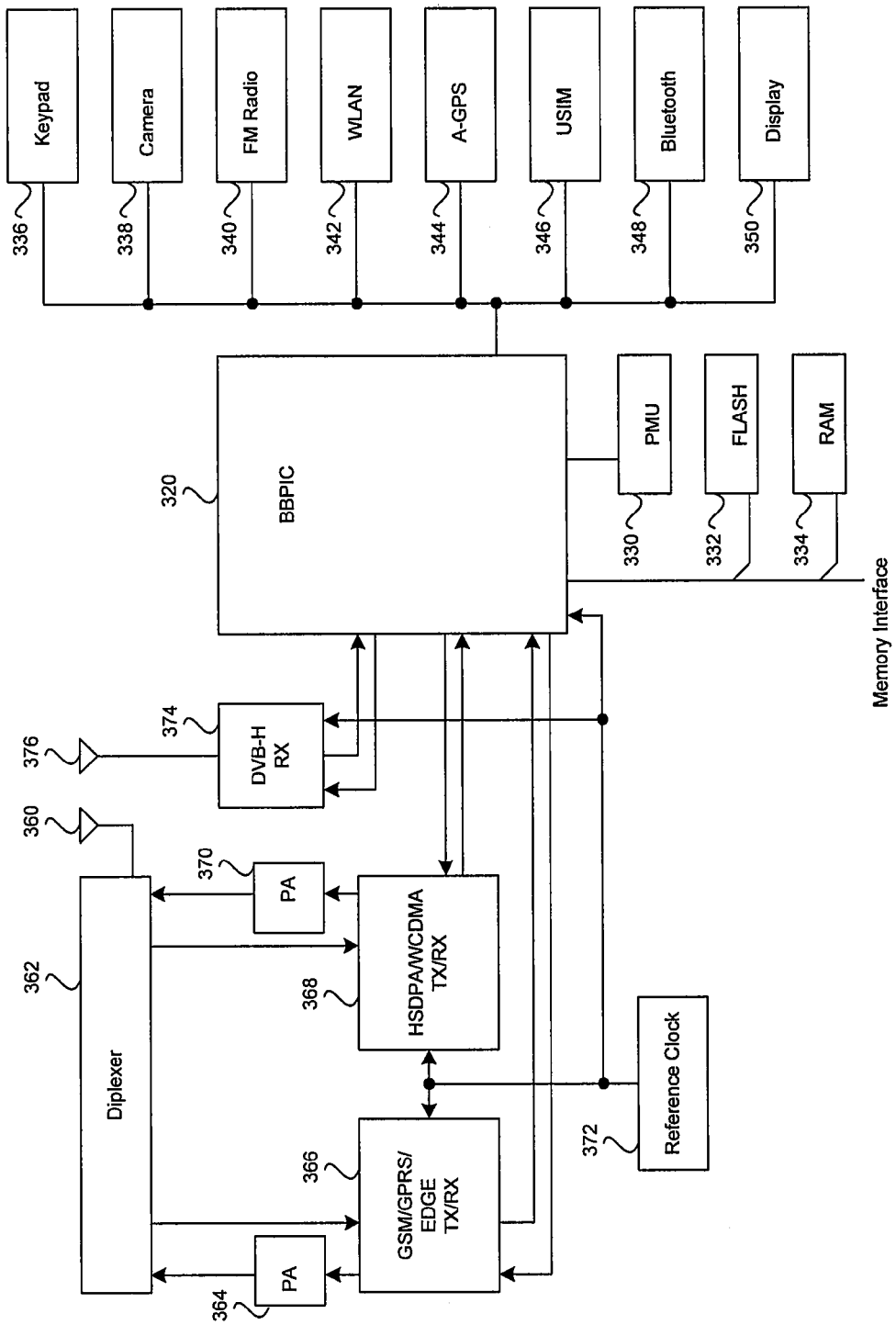
FIG. 3d is a block diagram illustrating an exemplary coupling of the BBPIC of FIG. 3a to a plurality of peripherals, in accordance with an embodiment of the invention.

FIG. 3d is a block diagram illustrating exemplary coupling of the BBPIC of FIG. 3a to a plurality of peripherals, in accordance with an embodiment of the invention. Referring to FIG. 3d, there is shown the BBPIC 320, the FLASH memory 330, the RAM 332, the PMU 334, plurality of peripherals 336, 338, 340, 342, 344, 346, 348, and 350. FIG. 3d further comprises antennas 360 and 376, a diplexer 362, power amplifiers (PAs) 364 and 370, RFFEs 366 and 368, receiver front end (RFE) 374, and a reference clock 372.

The BBPIC 320 may be coupled as described with respect to FIG. 3c. Additionally, the BBPIC 320 may be coupled to the RFFEs 366 and 368, the reference clock 372, and the RFE 374. The RFE 374 may also be coupled to the antenna 376. The reference clock 374 may be coupled to the RFFEs 366 and 368 and the RFE 374, in addition to the BBPIC 320. The RFFE 366 may be coupled to the PA 364, and the RFFE 368 may be coupled to the PA 370. The PAs 364 and 370 may be coupled to the diplexer 362, and the diplexer 362 may be coupled to the antenna 360.

The antennas 360 and 376 may comprise suitable logic and/or circuitry that may be adapted to receive and transmit RF signals. The diplexer 362 may comprise suitable logic and/or circuitry that may be adapted to isolate received signals from transmitted signals. This may allow received signals from being corrupted by much stronger transmitted signals. The diplexer 362 may also allow transmission of signals from multiple RFFEs, for example, RFFEs 366 and 368, to the same transmission antenna, for example, antenna 360.

The reference clock 372 may comprise suitable logic and/or circuitry that may be adapted to provide a clocking signal to the RFFEs 366 and 368, to the RFE 374, and to the BBPIC 320. The clocking signal may be utilized by various devices, for example, analog-to-digital converters, digital-to-analog converters, and latching devices that may receive digital data. The PAs 364 and 370 may comprise suitable logic and/or circuitry that may be adapted to amplify an analog signal sufficiently so that when the analog signal is transmitted by an antenna, for example, antenna 360 or 376, the transmitted signal may have sufficient strength that it may appear as a valid signal to a device receiving the transmitted signal, for example, a cellular base station.

The RFFEs 366 and 368 may comprise suitable logic, circuitry and/or code that may be adapted to receive a digital baseband signal, convert it to an analog signal and upconvert it to RF frequency so that it may be transmitted by an antenna, for example the antenna 360. The RFFEs 366 and 368 and the RFE 374 may comprise suitable logic, circuitry and/or code that may be adapted to receive a RF signal from an antenna, for example, antenna 376, and downconvert it to an analog baseband signal. The RFFEs 366 and 368 may convert the analog baseband signal to a digital baseband signal.

In operation, a RF signal may be received by the antenna 360, and the RF signal may be communicated to the diplexer 362. The diplexer 362 may communicate the signal to the RFFEs 366 and 368, and the RFFEs 366 and 368 may communicate digital baseband signals to the BBPIC 320. Similarly, a RF signal may be received by the antenna 376, and the RF signal may be communicated to the RFE 374. The RFE 374 may communicate a digital baseband signal to the BBPIC 320. The BBPIC 320 may process the digital baseband signals as described with respect to FIG. 3b and FIG. 3c.

During transmission, the BBPIC 320 may communicate digital baseband signals to at least one of the RFFEs 366 and 368. The RFFEs 366 and 368 may convert the digital baseband signals to analogs signals, and then upconvert the analog signals to RF signals. The RF signals may then be communicated to the PAs 364 and 370, respectively, by the RFFEs 366 and 368. The PAs 364 and 370 may amplify the RF signals and communicate the amplified RF signals to the diplexer 362 which may combine the amplified RF signals and communicate the combined RF signal to the antenna 360. The PMU 334, FLASH memory 330, the RAM 332, and the plurality of peripherals 336, 338, 340, 342, 344, 346, 348, and 350 may function as described in FIG. 3c.

Figure 3E:
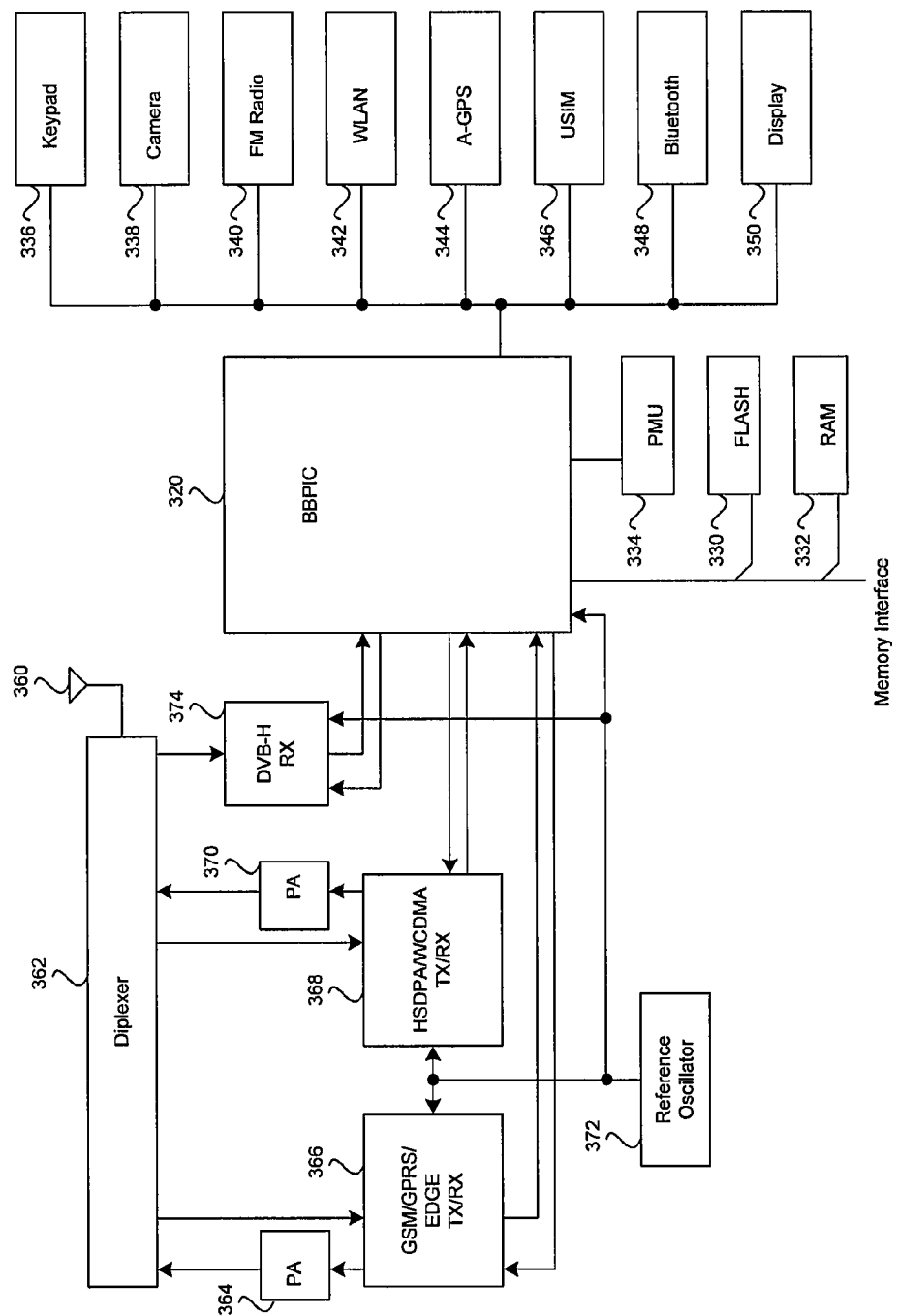
FIG. 3e is a block diagram illustrating exemplary coupling of the BBPIC of FIG. 3a to a plurality of peripherals, including RFFEs and a single antenna, in accordance with an embodiment of the invention.

FIG. 3e is a block diagram illustrating exemplary coupling of the BBPIC of FIG. 3a to a plurality of peripherals, including RFFEs and a single antenna, in accordance with an embodiment of the invention. Referring to FIG. 3e, there is shown the BBPIC 320, the FLASH memory 330, the RAM 332, the PMU 334, plurality of peripherals 336, 338, 340, 342, 344, 346, 348, and 350. There is further shown an antenna 360, a diplexer 362, power amplifiers (PAs) 364 and 370, RFFEs 366 and 368, receiver front end (RFE) 374, and a reference clock 372.

The various devices illustrated in FIG. 3e may be coupled as described with respect to FIG. 3d with a few exceptions. The antenna 360 may not be coupled to the RFE 374. Rather, the antenna 360 may be coupled to the diplexer 362, and the diplexer 362 may be coupled to the RFE 374. Therefore, the diplexer 362 may also communicate received RF signals to the RFE 374 to the RFFEs 366 and 368. The diplexer may also be communicated amplified RF signals from the PAs 364 and 370. In this regard, all RF reception and transmission may be via the antenna 360. The devices in FIG. 3e may function as described with respect to FIGS. 3b, 3c and 3d.

Figure 3F:
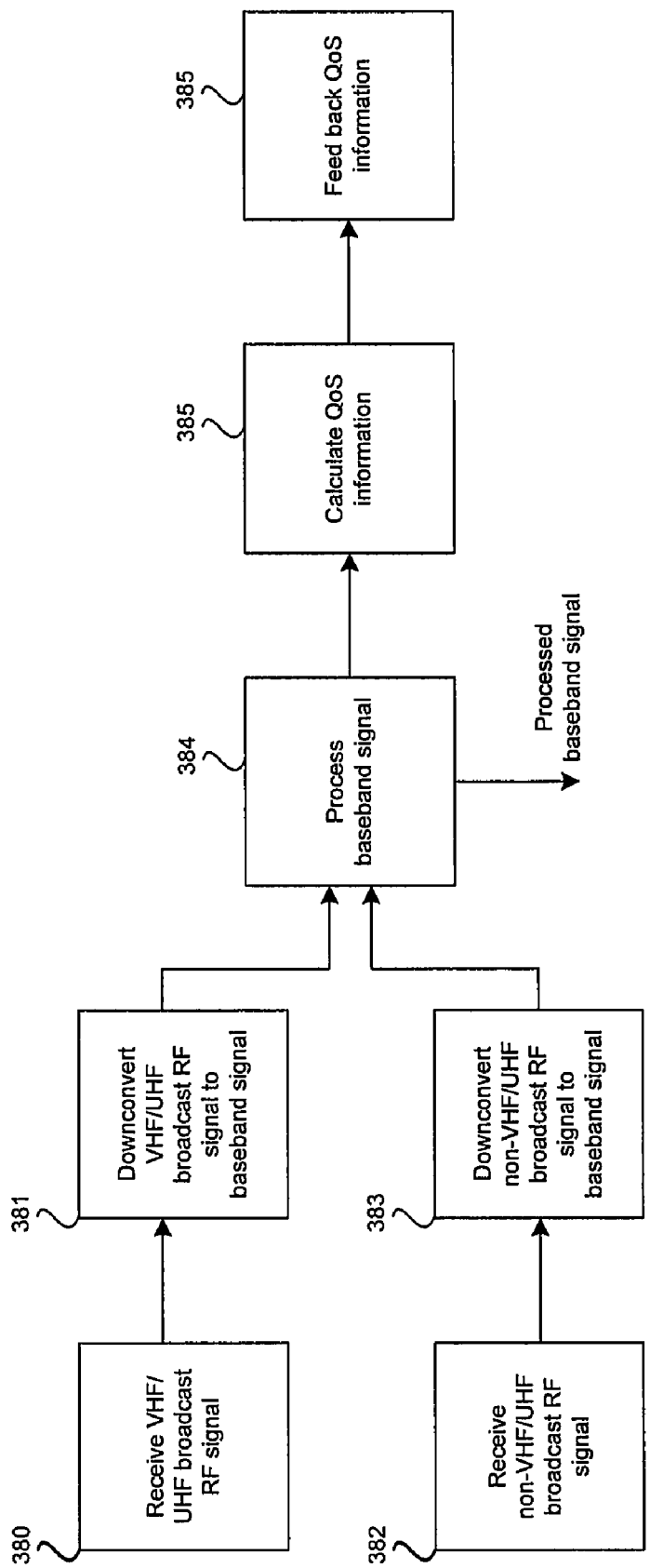
FIG. 3f is an exemplary flow diagram illustrating receiving an RF signal, converting the RF signal to a baseband signal, and calculating and feeding back quality of service (QOS) information, in accordance with an embodiment of the invention.

FIG. 3f is an exemplary flow diagram illustrating receiving an RF signal, converting the RF signal to a baseband signal, and calculating and feeding back quality of service (QOS) information, in accordance with an embodiment of the invention. Referring to FIG. 3f, in step 380, a VHF/UHF broadcast signal may be received at the antenna. In step 381, the VHF/UHF broadcast RF signal may be converted to a baseband signal. In step 382, a cellular RF signal may be received at the antenna. In step 383, the cellular RF signal may be converted to a baseband signal. In step 384, the baseband signal may be processed. The processed baseband signal may be further processed in step 385 and/or it may be communicated to other devices. For example, the processed baseband signal may be communicated to a WLAN peripheral interface and transmitted to a WLAN device. In step 385, QOS information may be calculated from the baseband signals. In step 386, the QOS information may be fed back to a service provider, for example, service provider 106 (FIG. 1e).

Referring to FIGS. 2b, 3b, 3d and 3f, there is shown a plurality of steps 380 to 386 that may be utilized to receive a RF signal, which may be a cellular communication signal, or cellular broadcast signal or a VHF/UHF broadcast signal. In step 380, a VHF/UHF broadcast RF signal may be received by the antenna 376 and the VHF/UHF broadcast RF signal may be, for example, DVB-H signal. The received signal may be communicated to the RFE 374. In step 381, the RFE 374 may downconvert the VHF/UHF broadcast RF signal to an analog baseband signal, and then convert the analog baseband signal to a digital baseband signal via an analog-to-digital converter 222. The digital baseband signal may be communicated to the BBPIC 320. In step 384, the digital baseband signal may be processed by one of a plurality of baseband processing modules 324, . . . , 326, and 328.

In step 382, a cellular RF signal may be received by the antenna 360, and the cellular RF signal may be communicated to the diplexer 362. The diplexer 362 may then communicate the cellular RF signal to the RFFEs 366 and 368. In step 383, the RFFEs 366 and 388 may downconvert the cellular RF signal to an analog baseband signal, and then convert the analog baseband signal to a digital baseband signal via the analog-to-digital converter 222. The digital baseband signal may be communicated to the BBPIC 320. In step 384, the digital baseband signal may be processed by one of a plurality of baseband processing modules 324, . . . , 326, and 328.

In step 385, QOS information may be calculated from the processed baseband signal. In step 386, the QOS information may be fed back to a service provider 106, and the service provider 106 may optionally take measures based on the QOS information. For example, the service provider 106 may decide to switch transmission of requested information from VHF/UHF broadcast provider to a cellular broadcast provider.

Although the QOS information is described as being calculated from the processed baseband signal, the invention need not be so limited. The QOS information may also be derived from other channel conditions such as, for example, signal to noise ratio, from a received signal strength indicator, an indication of throughput, and/or a statistical analysis of the received signal that may be utilized to indicate received signal quality. Depending on the channel conditions, the service provider 106 may change the characteristic of the transmitted signal by, for example, reducing the bit rate to decrease the probability of bit errors in the received signal.

QOS may also refer to the content of the information received by the mobile terminal. For example, a user at the mobile terminal may request that songs be delivered in MP3 format encoded at 192 Kbits/sec, and may further request that encoded bit rates of less than 128 Kbits/sec may not be acceptable. The service provider 106 may try to meet the desired requirements, but if delivery of 192 Kbits/sec encoded MP3 files cannot be supported, the service provider 106 may provide 128 Kbits/sec encoded MP3 files. If the bandwidth is not available for the 128 Kbits/sec encoded MP3 files, then the service provider may not deliver any MP3 files at all until a later time.

Similarly, a user at the mobile terminal may request video files with a high resolution level, and may further request that a minimum acceptable resolution may be medium resolution level. The service provider 106 may send some video files at the high resolution level when the bandwidth is available. The service provider 106 may send some video files at the medium resolution level if bandwidth usage increases to a point where the high resolution level cannot be supported. If bandwidth usage increases still further that video files can only be delivered at low resolution levels, the service provider 106 may not deliver any more video files until bandwidth usage decreases.

Figure 3G:
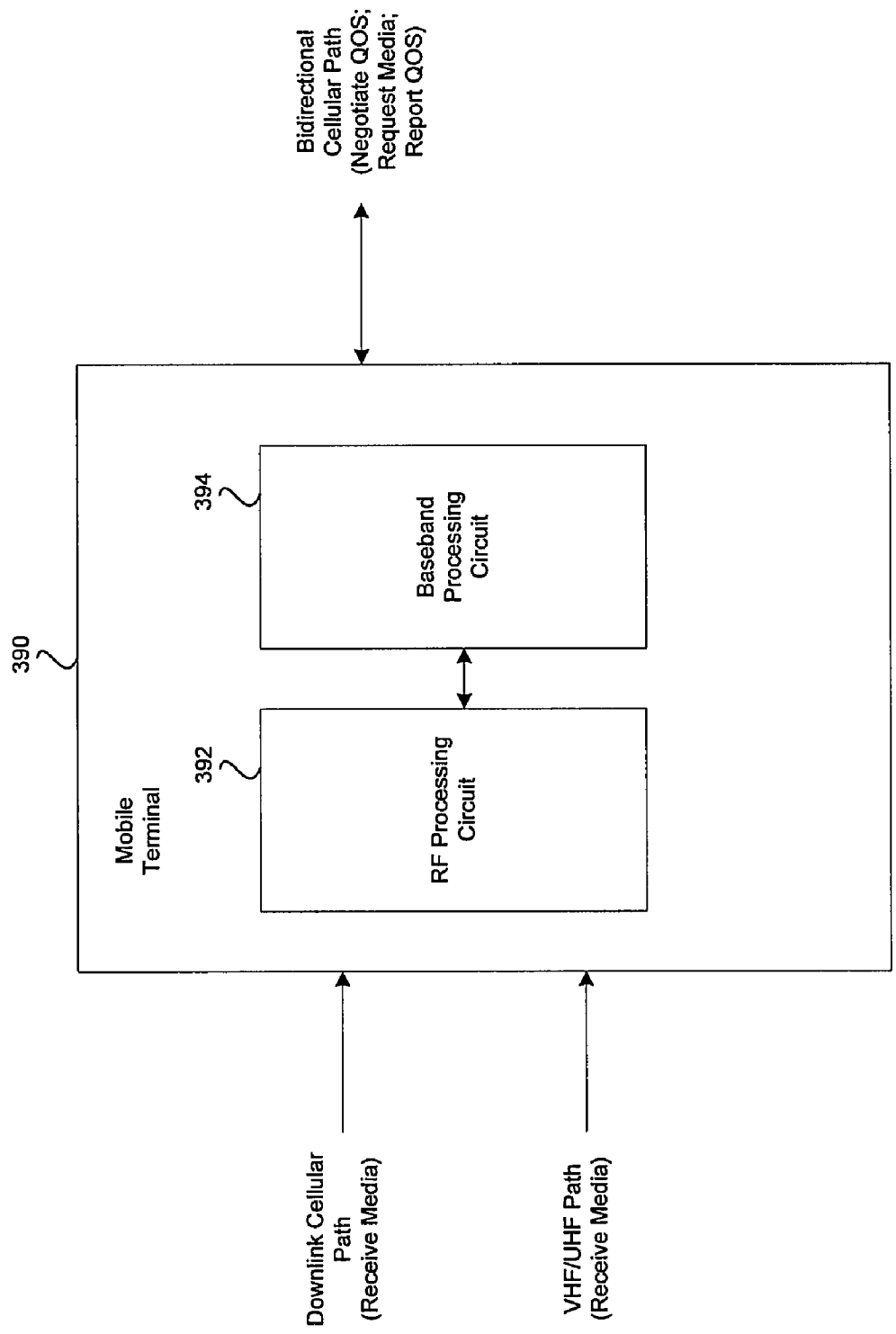
FIG. 3g is a block diagram illustrating exemplary communication between a mobile terminal and a plurality of different communication paths, in accordance with an embodiment of the invention.

FIG. 3g is a block diagram illustrating exemplary communication between a mobile terminal and a plurality of different communication paths, in accordance with an embodiment of the invention. Referring to FIG. 3g, there is shown a mobile terminal 390 that comprises a RF processing circuit 392 and a baseband processing circuit 394. The mobile terminal 390 may comprise suitable logic, circuitry, and/or code that may be adapted to communicate and process information from a plurality of different networks. In this regard, the mobile terminal 390 may receive information, which may comprise voice, data, images, video and/or applications, via a VHF/UHF communication path, a bi-directional cellular communication path, and/or a downlink cellular communication path. The mobile terminal 390 may also be adapted to transmit information via the bi-directional cellular communication path. In this regard, the transmitted information may be associated with information received from the VHF/UHF communication path, the bi-directional cellular communication path, or the downlink cellular communication path.

The RF processing circuit 392 may comprise suitable logic, circuitry, and/or code that may be adapted to process RF signals received via a VHF/UHF communication path, bi-directional cellular service communication path, and/or the downlink cellular communication path. The RF processing circuit 392 may also be adapted to process RF signals that may be transmitted to a bi-directional cellular service communication path. The baseband processing circuit 394 may comprise suitable logic, circuitry, and/or code that may be adapted to process broadcast information from, for example, the VHF/UHF communication path, and/or cellular information from, for example, the bi-directional cellular communication path, and/or the downlink cellular communication path. In this regard, the baseband processing circuit 394 may comprise different portions that may process information from different cellular communication paths and from VHF/UHF communication path.

In an exemplary embodiment of the invention, the mobile terminal 390 may negotiate with the service provider 106 via the bi-directional cellular communication path to establish a quality of service level that may be acceptable to the mobile terminal 390. The mobile terminal 390 may request media from a service provider 106 via the bi-directional cellular communication path. The service provider 106 may respond by transmitting the requested media via a VHF/UHF communication path, for example, by using the DVB standard. The service provider 106 may also transmit the requested media via a downlink cellular communication path, for example, by using the MBMS standard. The service provider 106 may further transmit the requested media via the bi-directional cellular communication path. A plurality of cellular standards may be used for transmission via the bi-directional cellular communication path, for example, UMTS, GSM, GPRS, EDGE, CDMA2000, WCDMA, and HSDPA. The mobile terminal 390 may determine the quality of service of requested or received media, as described with respect to FIG. 3f, and may report the determined quality of service to the service provider 106.

Although some embodiments of the invention have been described, the invention is not so limited. For example, the FIGS. 3d and 3e may be modified to include a third RFFE for handling CDMA2000 RF signals.

In accordance with an embodiment of the invention, aspects of an exemplary system may comprise, for example, the mobile terminal 390 requesting via a cellular service, media having a specified quality of service to be delivered to the mobile terminal 390. The requested media may be received via a single integrated cellular and VHF/UHF baseband processor, for example, the baseband processing circuit 394 within the mobile terminal 390, from the cellular service and/or a broadcast service. Some exemplary cellular service and broadcast services are discussed with respect to FIGS. 1a-1d, as well as in other figures.

The broadcast service may comprise, for example, a cellular broadcast service and/or a VHF/UHF broadcast service. The VHF/UHF broadcast service may comprise, for example, a digital video broadcasting (DVB) service, an integrated service digital broadcasting (ISDB) service, an integrated service digital broadcasting terrestrial (ISDB-T) service, and/or an advanced standards technical committee (ATSC) broadcast service. The mobile terminal 390 may consume the received requested media, for example, by processing the received media for a user to listen to or view the processed information.

The mobile terminal 390 may generate a request for the delivery of media comprising the specified quality of service. The request may be made using, for example, various circuitry such as the processor 256, the RF processing circuit 392, and/or the baseband processing circuit 394. The mobile terminal 390 may also negotiate for a specified quality of service. The processor 256 may negotiate, for example, using information provided by one or more circuits such as, for example, the RF processing circuit 392, and/or the baseband processing circuit 394. The negotiation may occur, for example, between the mobile terminal 390 and the cellular service and/or the broadcast service. The cellular service and/or the broadcast service may affect, for example, negotiation with the service provider 106. The mobile terminal 390 may determine, for example, a quality of service based on a received channel condition. The quality of service determined by the mobile terminal 390 for use in negotiation may be based on various factors such as, for example, signal to noise ratio, received signal strength, and/or bit error rate. The quality of service may be determined with the aid of various circuitry such as, for example, the processor 256, the RF processing circuit 392, and/or the baseband processing circuit 394.

Various circuitry, such as, for example, the processor 256, the RF processing circuit 392, and/or the baseband processing circuit 394 in the mobile terminal 390 may enable dynamically switching of receiving the requested media from the cellular service to receiving from the broadcast service when the cellular service may not be able to support the specified quality of service, but the broadcast service may be able to support the quality of service. Similarly, the mobile terminal 390 may dynamically switch receiving the requested media from the broadcast service to receiving from the cellular service. Similar circuitry may also allow simultaneously receiving a first portion of the requested media with the specified quality of service from the broadcast service and a second portion of the requested media with the specified quality of service from the cellular service.

Another embodiment of the invention may provide a machine-readable storage, having stored thereon, a computer program having at least one code section executable by a machine, thereby causing the machine to perform the steps as described above for cellular network services and an intelligent integrated broadcast television downlink having intelligent service control with feedback.

Accordingly, the present invention may be realized in hardware, software, or a combination of hardware and software.

The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and, which, when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of communicating in a plurality of communication networks, the method comprising:
   requesting by a mobile terminal via a cellular service, media to be delivered to said mobile terminal and a specified quality of service; and
   receiving by said mobile terminal via a single integrated cellular and VHF/UHF baseband processor within said mobile terminal, said requested media with said specified quality of service from one or both of said cellular service and a broadcast service.

2. The method according to claim 1, wherein said mobile terminal communicates with said cellular service via uplink and downlink communication paths.

3. The method according to claim 1, wherein said broadcast service comprises a cellular broadcast service and a VHF/UHF broadcast service.

4. The method according to claim 3, wherein said cellular broadcast service is a downlink only cellular broadcast service.

5. The method according to claim 3, wherein said cellular broadcast service and said cellular service are provided via a wireless service provider.

6. The method according to claim 3, wherein said VHF/UHF broadcast service comprises a digital video broadcasting (DVB) service, an integrated service digital broadcasting (ISDB) terrestrial service and an advanced television systems committee (ATSC) broadcast service.

7. The method according to claim 1, wherein said broadcast service comprises a cellular broadcast service.

8. The method according to claim 7, wherein said cellular broadcast service is a downlink only cellular broadcast service.

9. The method according to claim 7, wherein said cellular broadcast service and said cellular service are provided via a wireless service provider.

10. The method according to claim 1, wherein said broadcast service comprises a VHF/UHF broadcast service.

11. The method according to claim 10, wherein said VHF/UHF broadcast service comprises a digital video broadcasting (DVB) service, an integrated service digital broadcasting (ISDB) terrestrial service and an advanced television systems committee (ATSC) broadcast service.

12. The method according to claim 10, wherein said VHF/UHF broadcast service comprises a digital video broadcasting (DVB) service.

13. The method according to claim 10, wherein said VHF/UHF broadcast service comprises an integrated service digital broadcasting (ISDB) service.

14. The method according to claim 10, wherein said VHF/UHF broadcast service comprises an integrated service digital broadcasting terrestrial (ISDB-T) service.

15. The method according to claim 10, wherein said VHF/UHF broadcast service comprises an advanced television systems committee (ATSC) broadcast service.

16. The method according to claim 1, comprising generating within said mobile terminal, a request for said delivery of media and said specified quality of service.

17. The method according to claim 1, comprising consuming said received requested media by said mobile terminal.

18. The method according to claim 1, comprising negotiating said specified quality of service.

19. The method according to claim 18, wherein said negotiating occurs between said mobile terminal, and said cellular service and said broadcast service.

20. The method according to claim 18, wherein said negotiating occurs between said mobile terminal and said cellular service.

21. The method according to claim 18, wherein said negotiating occurs between said mobile terminal and said broadcast service.

22. The method according to claim 1, comprising determining said specified quality of service based on a received channel condition.

23. The method according to claim 1, comprising dynamically switching receiving said requested media with said specified quality of service from said cellular service to receiving from said broadcast service, when said specified quality of service cannot be supported by said cellular service, but said specified quality of service can be supported by said broadcast service.

24. The method according to claim 1, comprising dynamically switching receiving said requested media with said specified quality of service from said broadcast service to receiving from said cellular service, when said specified quality of service cannot be supported by said broadcast service, but said specified quality of service can be supported by said cellular service.

25. The method according to claim 1, comprising simultaneously receiving a first portion of said requested media with said specified quality of service from said broadcast service and a second portion of said requested media with said specified quality of service from said cellular service.

26. The method according to claim 1, wherein said received requested media is received from one or more of: global system for mobile communications (GSM), general packet radio service (GPRS), enhanced data rates for GSM evolution (EDGE), code division multiple access 2000 (CDMA2000), wideband CDMA (WCDMA), high speed downlink packet access (HSDPA) systems, and multiple broadcast/multicast service (MBMS).

27. A computer readable medium having stored thereon, a computer program having at least one code section for communicating in a plurality of communication networks, the at least one code section being executable by a computer for causing the computer to perform steps comprising:
   requesting by a mobile terminal via a cellular service, media be delivered to said mobile terminal and a specified quality of service; and
   receiving by said mobile terminal via a single integrated cellular and VHF/UHF baseband processor within said mobile terminal, said requested media with said specified quality of service from one or both of said cellular service and a broadcast service.

28. The computer readable medium according to claim 27, wherein said mobile terminal communicates with said cellular service via uplink and downlink communication paths.

29. The computer readable medium according to claim 27, wherein said broadcast service comprises a cellular broadcast service and a VHF/UHF broadcast service.

30. The computer readable medium according to claim 29, wherein said cellular broadcast service is a downlink only cellular broadcast service.

31. The computer readable medium according to claim 29, wherein said cellular broadcast service and said cellular service are provided via a wireless service provider.

32. The computer readable medium according to claim 29, wherein said VHF/UHF broadcast service comprises a digital video broadcasting (DVB) service, an integrated service digital broadcasting (ISDB) terrestrial service and an advanced television systems committee (ATSC) broadcast service.

33. The computer readable medium according to claim 27, wherein said broadcast service comprises a cellular broadcast service.

34. The computer readable medium according to claim 33, wherein said cellular broadcast service is a downlink only cellular broadcast service.

35. The computer readable medium according to claim 33, wherein said cellular broadcast service and said cellular service are provided via a wireless service provider.

36. The computer readable medium according to claim 27, wherein said broadcast service comprises a VHF/UHF broadcast service.

37. The computer readable medium according to claim 36, wherein said VHF/UHF broadcast service comprises a digital video broadcasting (DVB) service, an integrated service digital broadcasting (ISDB) terrestrial service and an advanced television systems committee (ATSC) broadcast service.

38. The computer readable medium according to claim 36, wherein said VHF/UHF broadcast service comprises a digital video broadcasting (DVB) service.

39. The computer readable medium according to claim 36, wherein said VHF/UHF broadcast service comprises an integrated service digital broadcasting (ISDB) service.

40. The computer readable medium according to claim 36, wherein said VHF/UHF broadcast service comprises an integrated service digital broadcasting terrestrial (ISDB-T) service.

41. The computer readable medium according to claim 36, wherein said VHF/UHF broadcast service comprises an advanced television systems committee (ATSC) broadcast service.

42. The computer readable medium according to claim 27, wherein said at least one code section comprises code for generating within said mobile terminal, a request for said delivery of media and said specified quality of service.

43. The computer readable medium according to claim 27, wherein said at least one code section comprises code for consuming said received requested media by said mobile terminal.

44. The computer readable medium according to claim 27, wherein said at least one code section comprises code for negotiating said specified quality of service.

45. The computer readable medium according to claim 44, wherein said negotiating occurs between said mobile terminal, and said cellular service and said broadcast service.

46. The computer readable medium according to claim 44, wherein said negotiating occurs between said mobile terminal and said cellular service.

47. The computer readable medium according to claim 44, wherein said negotiating occurs between said mobile terminal and said broadcast service.

48. The computer readable medium according to claim 27, wherein said at least one code section comprises code for determining said specified quality of service based on a received channel condition.

49. The computer readable medium according to claim 27, wherein said at least one code section comprises code for dynamically switching receiving said requested media with said specified quality of service from said cellular service to receiving from said broadcast service, when said specified quality of service cannot be supported by said cellular service, but said specified quality of service can be supported by said broadcast service.

50. The computer readable medium according to claim 27, wherein said at least one code section comprises code for dynamically switching receiving said requested media with said specified quality of service from said broadcast service to receiving from said cellular service, when said specified quality of service cannot be supported by said broadcast service, but said specified quality of service can be supported by said cellular service.

51. The computer readable medium according to claim 27, wherein said at least one code section comprises code for simultaneously receiving a first portion of said requested media with said specified quality of service from said broadcast service and a second portion of said requested media with said specified quality of service from said cellular service.

52. The computer readable medium to claim 27, wherein said received requested media is received from one or more of: global system for mobile communications (GSM), general packet radio service (GPRS), enhanced data rates for GSM evolution (EDGE), code division multiple access 2000 (CDMA2000), wideband CDMA (WCDMA), high speed downlink packet access (HSDPA) systems, and multiple broadcast/multicast service (MBMS).

53. A system of communicating in a plurality of communication networks, the system comprising:
   a mobile terminal operable to request via a cellular service, media to be delivered to said mobile terminal and a specified quality of service; and
   said mobile terminal operable to receive, via a single integrated cellular and VHF/UHF baseband processor within said mobile terminal, said requested media with said specified quality of service from one or both of said cellular service and a broadcast service.

54. The system according to claim 53, wherein said mobile terminal is operable to communicate with said cellular service via uplink and downlink communication paths.

55. The system according to claim 53, wherein said broadcast service comprises a cellular broadcast service and a VHF/UHF broadcast service.

56. The system according to claim 55, wherein said cellular broadcast service is a downlink only cellular broadcast service.

57. The system according to claim 55, wherein said cellular broadcast service and said cellular service are provided via a wireless service provider.

58. The system according to claim 55, wherein said VHF/UHF broadcast service comprises a digital video broadcasting (DVB) service, an integrated service digital broadcasting (ISDB) terrestrial service and an advanced television systems committee (ATSC) broadcast service.

59. The system according to claim 53, wherein said broadcast service comprises a cellular broadcast service.

60. The system according to claim 59, wherein said cellular broadcast service is a downlink only cellular broadcast service.

61. The system according to claim 59, wherein said cellular broadcast service and said cellular service are provided via a wireless service provider.

62. The system according to claim 53, wherein said broadcast service comprises a VHF/UHF broadcast service.

63. The system according to claim 62, wherein said VHF/UHF broadcast service comprises a digital video broadcasting (DVB) service, an integrated service digital broadcasting (ISDB) terrestrial service and an advanced television systems committee (ATSC) broadcast service.

64. The system according to claim 62, wherein said VHF/UHF broadcast service comprises a digital video broadcasting (DVB) service.

65. The system according to claim 62, wherein said VHF/UHF broadcast service comprises an integrated service digital broadcasting (ISDB) service.

66. The system according to claim 62, wherein said VHF/UHF broadcast service comprises an integrated service digital broadcasting terrestrial (ISDB-T) service.

67. The system according to claim 62, wherein said VHF/UHF broadcast service comprises an advanced television systems committee (ATSC) broadcast service.

68. The system according to claim 53, wherein said mobile terminal is operable to generate a request for said delivery of media and said specified quality of service.

69. The system according to claim 53, wherein said mobile terminal is operable to consume said received requested media.

70. The system according to claim 53, comprising one or more circuits in said mobile terminal that are operable to negotiate said specified quality of service.

71. The system according to claim 70, wherein said negotiating occurs between said mobile terminal, and said cellular service and said broadcast service.

72. The system according to claim 70, wherein said negotiating occurs between said mobile terminal and said cellular service.

73. The system according to claim 70, wherein said negotiating occurs between said mobile terminal and said broadcast service.

74. The system according to claim 53, comprising one or more circuits in said mobile terminal that are operable to determine said specified quality of service based on a received channel condition.

75. The system according to claim 53, comprising one or more circuits in said mobile terminal that are operable to dynamically switch receiving of said requested media with said specified quality of service from said cellular service to receiving from said broadcast service, when said specified quality of service cannot be supported by said cellular service, but said specified quality of service can be supported by said broadcast service.

76. The system according to claim 53, comprising one or more circuits in said mobile terminal that are operable to dynamically switch receiving of said requested media with said specified quality of service from said broadcast service to receiving from said cellular service, when said specified quality of service cannot be supported by said broadcast service, but said specified quality of service can be supported by said cellular service.

77. The system according to claim 53, comprising one or more circuits in said mobile terminal that are operable to simultaneously receive a first portion of said requested media with said specified quality of service from said broadcast service and a second portion of said requested media with said specified quality of service from said cellular service.

78. The system according to claim 53, wherein said received requested media is received from one or more of: global system for mobile communications (GSM), general packet radio service (GPRS), enhanced data rates for GSM evolution (EDGE), code division multiple access 2000 (CDMA2000), wideband CDMA (WCDMA), high speed downlink packet access (HSDPA) systems, and multiple broadcast/multicast service (MBMS).

* * * * *